(12) United States Patent
Toyoda et al.

(10) Patent No.: US 11,678,057 B2
(45) Date of Patent: *Jun. 13, 2023

(54) CONTROL APPARATUS, LENS APPARATUS, IMAGING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Yumi Toyoda, Ibaraki (JP); Fuya Mizuochi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,197

(22) Filed: Nov. 8, 2021

(65) Prior Publication Data

US 2022/0060631 A1 Feb. 24, 2022

Related U.S. Application Data

(63) Continuation of application No. 17/159,542, filed on Jan. 27, 2021, now Pat. No. 11,202,013.

(30) Foreign Application Priority Data

Jan. 30, 2020 (JP) .............. JP2020-014226
Jan. 30, 2020 (JP) .............. JP2020-014227
Jan. 30, 2020 (JP) .............. JP2020-014228

(51) Int. Cl.
*H04N 23/69* (2023.01)
*H04N 23/67* (2023.01)

(52) U.S. Cl.
CPC ........... *H04N 23/69* (2023.01); *H04N 23/675* (2023.01)

(58) Field of Classification Search
CPC ......... H04N 5/23296; H04N 5/232127; G02B 7/10; G02B 7/08; G02B 7/02; G03B 17/14; G03B 17/18

(Continued)

(56) References Cited

U.S. PATENT DOCUMENTS 5,872,661 A    2/1999   Suzuki et al.
6,731,339 B2   5/2004   Ohkawara
(Continued)

FOREIGN PATENT DOCUMENTS

JP    H09-197253 A    7/1997
JP    2006-184816 A   7/2006
(Continued)

OTHER PUBLICATIONS

Notice of Reasons for Rejection issued by the Japan Patent Office dated Aug. 2, 2022 in corresponding JP Patent Application No. 2020-014227, with English translation.

*Primary Examiner* — Pritham D Prabhakher
(74) *Attorney, Agent, or Firm* — Carter, DeLuca & Farrell LLP

(57) ABSTRACT

A control apparatus includes at least one processor configured to execute instructions to function as a first controller that automatically adjusts a focus lens to a focusing position, a second controller that adjusts the focus lens on the basis of a user operation quantity, and a third controller that drives the focus lens. The first controller and the second controller effectively work in a first drive area of the focus lens. The first controller is disabled in a second drive area of the focus lens. The third controller drives the focus lens on the basis of changes of the second drive area.

23 Claims, 24 Drawing Sheets

(58) Field of Classification Search
USPC .......................................................... 348/352
See application file for complete search history.

(56) References Cited

U.S. PATENT DOCUMENTS

| | | | |
|---|---|---|---|
| 9,645,473 B2* | 5/2017 | Tsuruoka | H04N 23/673 |
| 9,842,117 B1 | 12/2017 | Zhou et al. | |
| 10,165,188 B2* | 12/2018 | Kakimoto | G02B 7/102 |
| 10,230,887 B2 | 3/2019 | Okuyama et al. | |
| 10,412,292 B2 | 9/2019 | Uemura | |
| 10,587,811 B2 | 3/2020 | Ise | |
| 10,638,033 B2* | 4/2020 | Tomosada | H04N 23/611 |
| 10,834,326 B2* | 11/2020 | Ichinose | H04N 23/69 |
| 2002/0075395 A1 | 6/2002 | Ohkawara | |
| 2006/0140608 A1 | 6/2006 | Triteyaprasert et al. | |
| 2011/0158627 A1 | 6/2011 | Hirai et al. | |
| 2012/0057062 A1* | 3/2012 | Hamada | G02B 7/282 |
| | | | 348/E5.045 |
| 2013/0321692 A1* | 12/2013 | Kawanishi | H04N 23/663 |
| | | | 359/823 |
| 2014/0300716 A1* | 10/2014 | Tsuruoka | G03B 13/36 |
| | | | 348/65 |
| 2015/0085177 A1* | 3/2015 | Okada | H04N 23/69 |
| | | | 348/345 |
| 2015/0215518 A1 | 7/2015 | Nishiguchi et al. | |
| 2016/0014325 A1* | 1/2016 | Okada | G03B 13/36 |
| | | | 348/335 |
| 2016/0212323 A1 | 7/2016 | Ishii | |
| 2016/0306135 A1* | 10/2016 | Kakimoto | G02B 7/102 |
| 2016/0320588 A1* | 11/2016 | Kindaichi | H04N 23/663 |
| 2017/0034424 A1 | 2/2017 | Uemura | |
| 2017/0099428 A1 | 4/2017 | Okuyama et al. | |
| 2019/0182432 A1* | 6/2019 | Ise | H04N 23/675 |
| 2019/0353988 A1* | 11/2019 | Yamasaki | H04N 23/631 |
| 2019/0356843 A1 | 11/2019 | Uemura | |

FOREIGN PATENT DOCUMENTS

| | | |
|---|---|---|
| JP | 2012-133218 A | 7/2012 |
| JP | 2013-024977 A | 2/2013 |
| JP | 5843442 B2 | 1/2016 |
| JP | 2019-082646 A | 5/2019 |
| JP | 2019074598 A | 5/2019 |

\* cited by examiner

CONTROL APPARATUS, LENS APPARATUS, IMAGING APPARATUS, CONTROL METHOD, AND NON-TRANSITORY COMPUTER-READABLE STORAGE MEDIUM

CROSS REFERENCE TO RELATED APPLICATIONS

This application is a continuation of U.S. patent application Ser. No. 17/159,542, filed on Jan. 27, 2021, which claims the benefit of and priority to Japanese Patent Application No. 2020-014226, filed on Jan. 30, 2020, Japanese Patent Application No. 2020-014227, filed on Jan. 30, 2020 and Japanese Patent Application No. 2020-014228, filed on Jan. 30, 2020 each of which is hereby incorporated by reference herein in its entirety.

BACKGROUND OF THE INVENTION

Field of the Invention

The present invention relates a control apparatus capable of performing focusing by driving a focus lens and a control method.

Description of the Related Art

Autofocus (AF) and manual focus (MF) has been known as methods for performing focusing by driving a focus lens. The AF performs focusing by calculating a focusing position of the focus lens based on an AF evaluation value generated from an AF sensor. The MF performs focusing based on a user's manual operation of a focus ring.

Further, zoom tracking control that corrects image plane fluctuations occurring by driving a zoom lens by driving the focus lens to maintain a focusing state has been known. Japanese Patent No. 5843442 discloses a method switching an area mode on the basis of electronic cam (tracking curve) information that shows a relation between a zoom lens position and a focus lens position to maintain the focusing state during zooming.

SUMMARY OF THE INVENTION

The present invention provides a control apparatus that prevents switching from an AF available area to a MF exclusive area unintended by a user to improve user operability, a lens apparatus, an imaging apparatus, a control method, and a non-transitory computer-readable storage.

A control apparatus according to one aspect of the present invention includes at least one processor configured to execute instructions to function as a first controller that automatically adjusts a focus lens to a focusing position, a second controller that adjusts the focus lens on the basis of a user operation quantity, and a third controller that drives the focus lens. The first controller and the second controller effectively work in a first drive area of the focus lens. The first controller is disabled in a second drive area of the focus lens. The third controller drives the focus lens on the basis of changes of the second drive area.

Further features of the present invention will become apparent from the following description of exemplary embodiments with reference to the attached drawings.

DESCRIPTION OF THE EMBODIMENTS

Exemplary embodiments of the invention will be described below with reference to the accompanied drawings.

Figure 1:
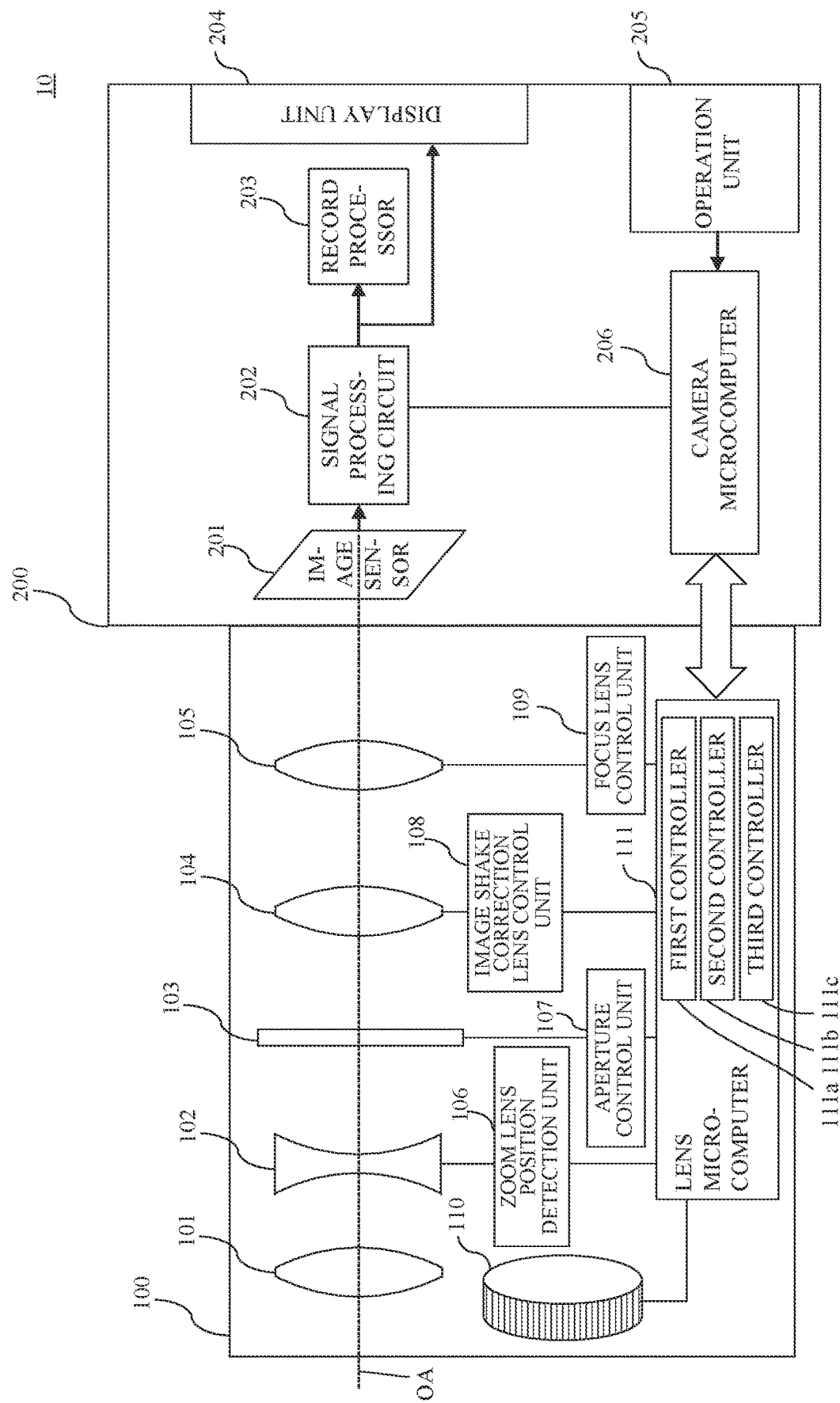
FIG. 1 is a block diagram of an imaging apparatus according to first to third embodiments.

First, a description will be given of a configuration of an imaging apparatus according to first to third embodiments. FIG. 1 is a block diagram of an imaging apparatus 10. The imaging apparatus 10 includes a camera body (imaging apparatus body) 200 and an interchangeable lens (lens apparatus) 100 that can be attached to and detached from the camera body 200. However, the imaging apparatus according to the first to third embodiments is not limited to this, and the camera body and the lens apparatus may be integrally configured.

The interchangeable lens 100 is mechanically and electrically connected to the camera body 200 through a mount (not illustrated). The interchangeable lens 100 receives power from the camera body 200 through a power supply terminal (not illustrated) provided on the mount described above. The interchangeable lens 100 controls various actuators and a lens microcomputer 111, which will be described later, by using the power received from the camera body 200. The camera body 200 performs communication with the interchangeable lens 100 through a communication terminal (not illustrated) provided on the mount described above and sends a control command to the interchangeable lens 100 to control the interchangeable lens 100.

The camera body 200 includes an image sensor 201 having a phase difference AF sensor function, a signal processing circuit 202, a record processor 203, a display unit 204, an operation unit 205, and a camera microcomputer 206. The image sensor 201 has a CMOS sensor and a CCD sensor, and photoelectrically converts an object image (optical image) formed by an image pickup optical system in the interchangeable lens 100 to output an electric signal (analog signal). The analog signal output from the image sensor 201 is converted into a digital signal by an A/D conversion circuit (not illustrated).

The signal processing circuit 202 performs various image processing on the digital signal from the A/D conversion circuit to generate a video signal. Further, the signal processing circuit 202 generates a contrast state of the object image, that is, focus information indicating a focusing state of the image pickup optical system and luminance information indicating an exposure state, from the video signal. Additionally, the signal processing circuit 202 outputs the video signal to the display unit 204, and the display unit 204 displays the video signal as a live view image used for checking composition, the focusing state, and the like. Furthermore, the signal processing circuit 202 outputs the video signal to the record processor 203. The record processor 203 stores the video signal as still image or moving image data in an external memory or the like.

The camera microcomputer 206 as a camera control unit controls the camera body 200 in response to inputs from an imaging instruction switch, various setting switches, and the like included in the operation unit 205. Further, the camera microcomputer 206 transmits a control command regarding a light quantity adjustment operation of an aperture unit 103 according to the luminance information and a focusing operation of the focus lens 105 according to the focus information to the lens microcomputer 111 via a camera communication unit.

The interchangeable lens 100 includes the image pickup optical system, control units that respectively control each actuator driving the image pickup optical system, an operation ring 110 to operate the focus lens 105, and the lens microcomputer 111.

The lens microcomputer 111 is a lens control unit (control apparatus) that controls an operation of each part in the interchangeable lens 100. The lens microcomputer 111 receives the control command transmitted from the camera body 200 via a communication unit and receives a transmission request of lens data. Further, the lens microcomputer 111 performs lens control corresponding to the control command and transmits the lens data corresponding to the transmission request to the camera body 200. Additionally, the lens microcomputer 111 outputs a command to an aperture control unit 107 and a focus lens control unit 109 in response to a command regarding light intensity adjustment and a command regarding focusing among control commands. The aperture control unit 107 and the focus lens control unit (focus driving means) 109 respectively drive the aperture unit 103 and the focus lens 105 in accordance with the command from the lens microcomputer 111. Thereby, light quantity adjustment processing by the aperture unit 103 and the focus lens 105 and autofocus processing for controlling the focusing operation can be performed. Furthermore, the lens microcomputer 111 outputs the command to the focus lens control unit 109 to drive the focus lens 105 according to an operation quantity of the operation ring 110 and controls the focusing operation.

In each embodiment, the lens microcomputer 111 has a first controller 111a, a second controller 111b, and a third controller 111c. The first controller 111a automatically adjusts the focus lens 105 to a focusing position (that is, the first controller 111a has a function of realizing AF control). The second controller 111b manually adjusts the focus lens 105 (on the basis of a user operation quantity) (that is, the second controller 111b has a function of realizing MF control). The third controller 111c drives the focus lens 105 (zoom tracking control, etc.).

The third controller 111c controls the focus lens 105 when a first drive area (AF available area) of the focus lens 105 and a second drive area (MF exclusive area) of the focus lens 105 change, as described later. That is, the third controller 111c has a function of driving or stopping the focus lens 105 to position the focus lens 105 in a proper position when the AF available area or the MF exclusive area of the focus lens 105 changes.

In this embodiment, an example in which the lens microcomputer 111 has the first controller 111a, the second controller 111b, and the third controller 111c has been described. This can be regarded as equivalent to the fact that the lens microcomputer 111 has a function corresponding to the function of the first controller 111a, a function corresponding to the function of the second controller 111b, and a function corresponding to the function of the third controller 111c.

As described below, the first controller 111a and the second controller 111b effectively work in the first drive area (AF available area) of the focus lens 105, and the first controller 111a is disabled in the second drive area (MF exclusive area) of the focus lens 105. The third controller 111c drives the focus lens 105 on the basis of changes of the second drive area (increase/decrease changes in ratio of the second drive area to an entire drive area).

The image pickup optical system includes a field lens 101, a zoom lens 102 that performs zooming, an aperture unit 103 that adjusts light quantity, an image shake correction lens 104, and the focus lens 105 that performs focusing. The zoom lens 102 can move in a direction (optical axis direction) along an optical axis OA shown by a broken line in the figure, and a zoom operation part connected to a zoom mechanism (not illustrated) is driven in the optical axis direction by a user operation. As a result, zooming is performed in which a focal length of the image pickup optical system is changed by moving the zoom lens 102.

A zoom lens position detection unit 106 detects a zoom lens position using a position detection sensor such as a variable resistor and outputs position data of the zoom lens 102 to the lens microcomputer 111. The position data output from the zoom lens position detection unit 106 is used in the lens microcomputer 111 for zoom tracking control and the like described later.

The aperture unit 103 includes sensors such as diaphragm blades and hall elements. A state of the diaphragm blades is detected by the above-mentioned sensor and is outputted to the lens microcomputer 111. The aperture control unit 107 outputs a driving signal in accordance with the command from the lens microcomputer 111 to drive an actuator such as a stepping motor or a voice coil motor. As a result, the light quantity adjustment by the aperture unit 103 can be performed.

The image shake correction lens 104 reduces image shake caused by camera shake or the like by moving in a direction orthogonal to the optical axis OA of the image pickup optical system. An image shake correction lens control unit 108 outputs a drive signal in accordance with the command from the lens microcomputer 111 according to a vibration detected by a vibration sensor (not illustrated) such as a vibration gyro to drive an image stabilization actuator. Thereby, image stabilization processing to control a shift operation of the image shake correction lens 104 can be performed.

A position of the focus lens 105, which is movable in the optical axis direction, is detected by a position detection sensor such as a photo interrupter, and position data is outputted to the lens microcomputer 111. The focus lens control unit 109 outputs a drive signal in accordance with the command from the lens microcomputer 111 to drive an actuator such as a stepping motor, and focusing is performed by moving the focus lens 105.

Further, the focus lens 105 corrects image plane fluctuation due to zooming by the zoom lens 102. In a rear focus type zooming optical system, the image plane fluctuation generated when the zoom lens 102 is moved to perform zooming is corrected by moving the focus lens 105, and the zoom tracking control to maintain a focusing state is performed.

Figure 2:
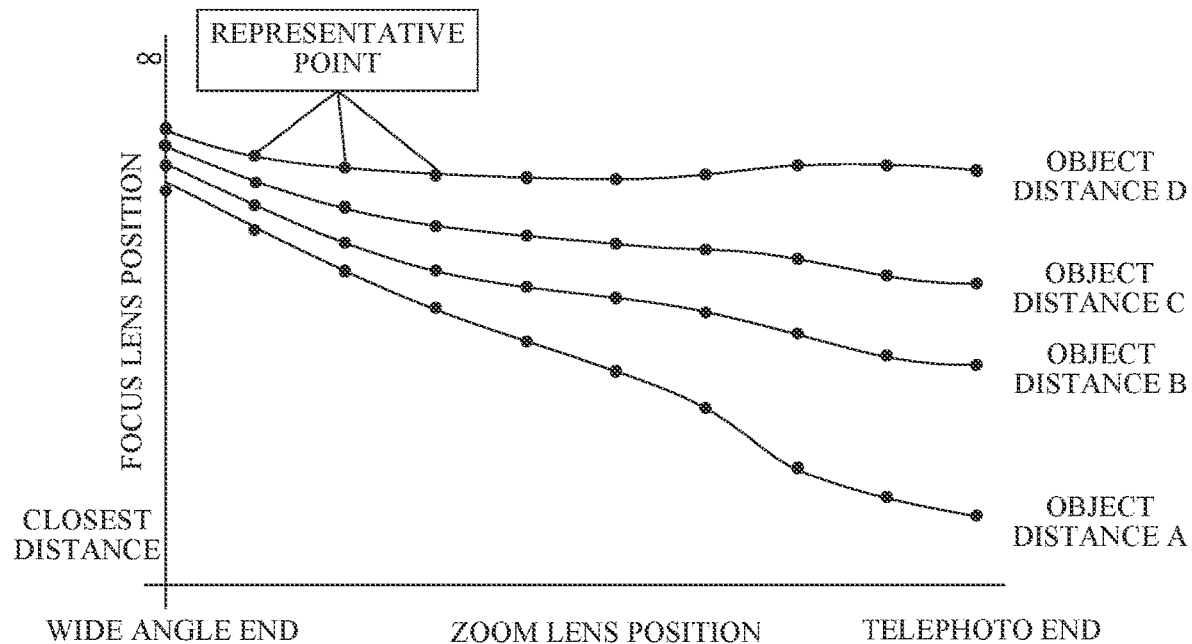
FIG. 2 illustrates electronic cam data for each an object distance according to the first to third embodiments.

Here, referring now to FIG. 2, a description will be given of the zoom tracking control. FIG. 2 illustrates electronic cam data for each an object distance. In FIG. 2, the abscissa axis denotes a position of the zoom lens 102 (zoom lens position), and the ordinate axis denotes the position of the focus lens 105 (focus lens position). In order to perform the zoom tracking control, information regarding electronic cam data (tracking curve) is stored in a memory (internal memory) (not illustrated) mounted on the lens microcomputer 111. As illustrated in FIG. 2, the electronic cam data shows a relation between the zoom lens position and the focus lens position set to maintain the focusing state according to the object distance. The lens microcomputer 111 outputs the control command to the focus lens control unit 109 on the basis of the electronic cam data and drives the focus lens 105 to perform the tracking control.

In each embodiment, the electronic cam data is created on the basis of focus sensitivity, which is an image plane movement amount with respect to unit drive amount of the focus lens 105. However, as illustrated in FIG. 2, the electronic cam data actually stored in the memory corresponds to a plurality of typical object distances A to D and shows a focus lens position with respect to a typical zoom lens position (representative point). The focus lens position can be calculated by performing linear interpolation according to a ratio of distances to a plurality of representative points close to the zoom lens position other than the representative point.

Figure 3:
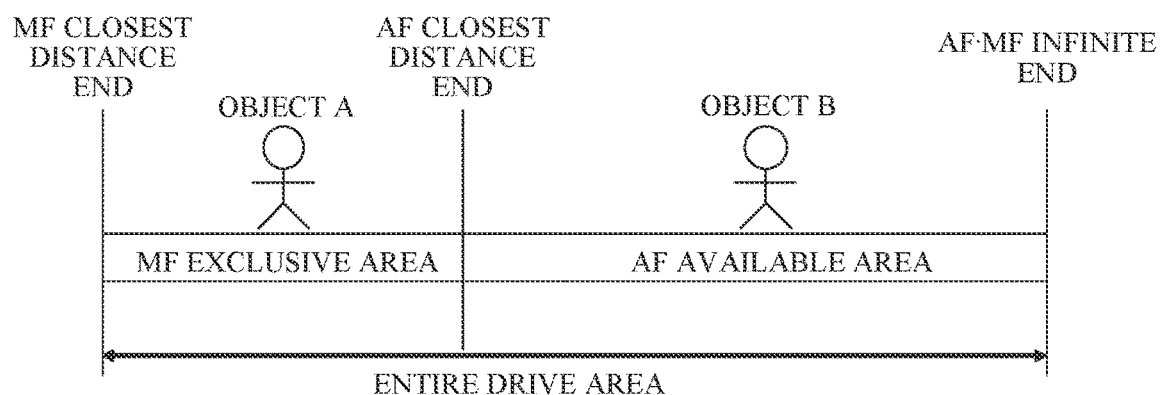
FIG. 3 illustrates an AF available area and a MF exclusive area according to the first to third embodiments.

Next, referring now to FIG. 3, a description will be given of the AF available area and the MF exclusive area. FIG. 3 illustrates the AF available area and the MF exclusive area. Here, the AF available area is an area where focusing can be performed in both the AF and the MF, and the MF exclusive area is an area where focusing can be performed in the only MF. In this embodiment, the AF available area is located between an AF·MF infinite end and an AF closest distance end, and the MF exclusive area is located between a MF closest distance end and the AF·MF infinite end. Further, in this embodiment, the entire drive area is a combined area of the AF available area and the MF exclusive area.

The imaging apparatus 10 of each embodiment can perform focusing by driving the focus lens 105 in the AF that performs focusing automatically or the MF that performs focusing manually. In the AF, the camera microcomputer 206 calculates the focusing position of the focus lens 105 on the basis of an AF evaluation value according to the video signal generated by the image sensor 201 and transmits the control command regarding focusing to the lens microcomputer 111 through the camera communication unit. The lens microcomputer 111 outputs the command to the focus lens control unit 109 in accordance with the control command transmitted from the camera microcomputer 206 and drives the focus lens 105 to control the focusing operation. In the MF, the lens microcomputer 111 outputs the command to the focus lens control unit 109 in accordance with an operation amount of the operation ring 110 and drives the focus lens 105 to control the focusing operation.

The AF available area illustrated in FIG. 3 is an area where focusing can be performed in both the AF and the MF. Thus, the object B existing in the AF available area can be focused in both the AF and the MF. On the other hand, since the AF evaluation value cannot be calculated accurately, the MF exclusive area illustrated in FIG. 3 is an area in which focusing by the AF cannot be performed and the focusing by the MF can be performed. Thus, the object A existing in the MF exclusive area can be focused only in the MF.

Hereinafter in first to third embodiments, a description will be given of a control method of the imaging apparatus 10.

First Embodiment

Figure 4:
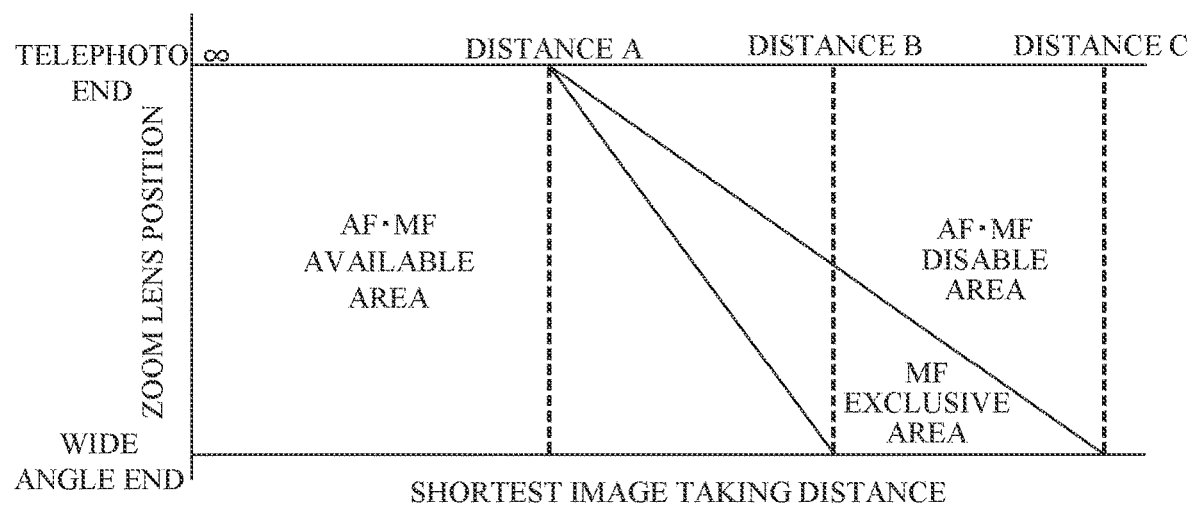
FIG. 4 illustrates a relation between a zoom lens position and the shortest image taking distance according to the first embodiment.

First, a description will be given of the first embodiment of the present invention. In this embodiment, a description will be given of a flow of focus lens control by the zoom tracking processing. FIG. 4 illustrates a relation between the zoom lens position and the shortest image taking distance. In FIG. 4, the ordinate axis denotes the zoom lens position (the position of the zoom lens 102), and the abscissa axis denotes the shortest image taking distance. As illustrated in FIG. 4, the shortest image taking distance changes according to the position of the zoom lens 102, and an image taking distance existed in the AF available area on the wide angle end side exists in the MF exclusive area on the telephoto end side. As just described, in this embodiment, the AF available area (AF·MF available area) and the MF exclusive area are switched according to the zoom position.

Figure 5:
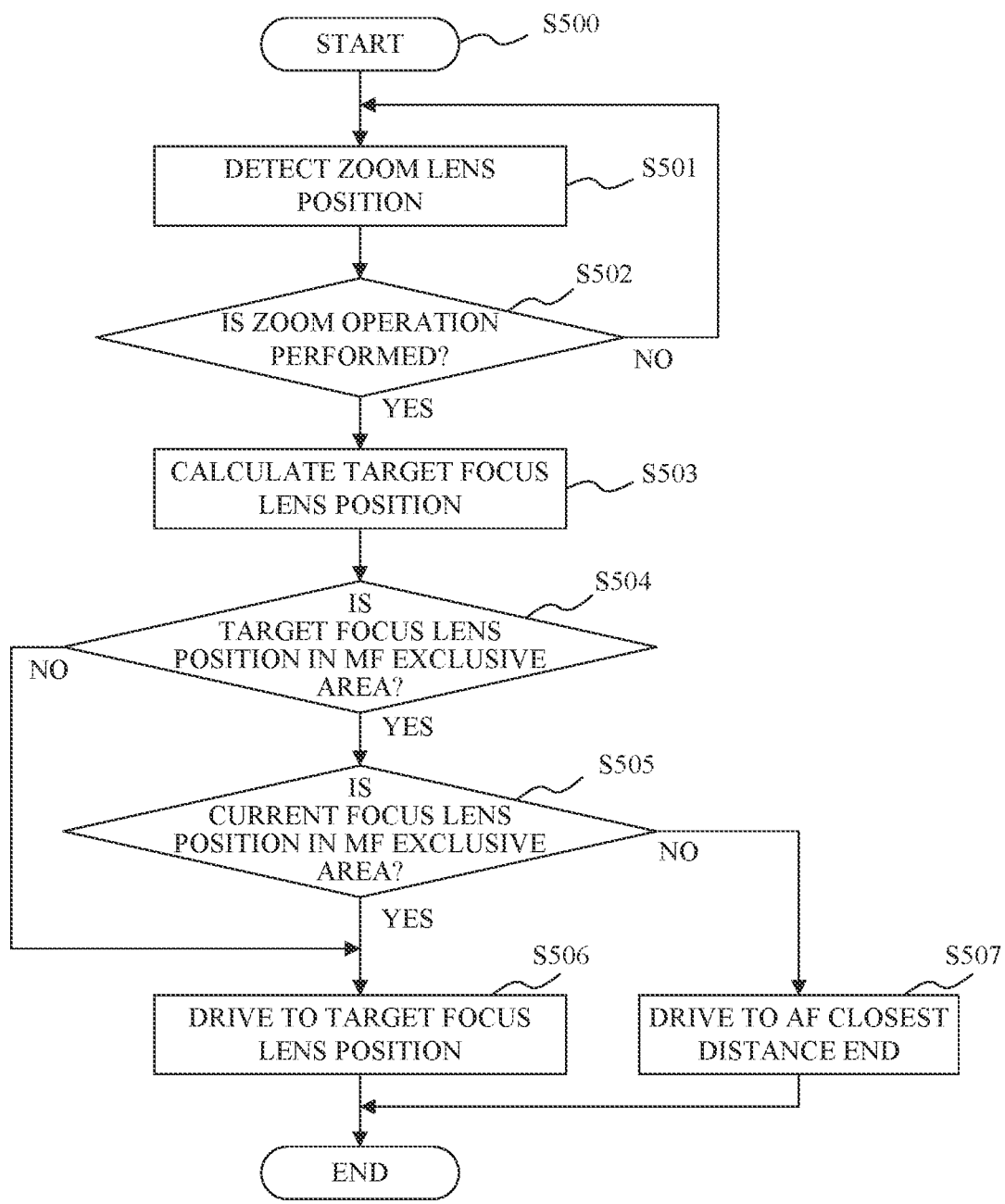
FIG. 5 is a flowchart of a control method according to the first embodiment.

Next, referring now to FIG. 5, a description will be given of a flow of the focus lens control (control method) when switching between the AF available area (first drive area) and the MF exclusive area (second drive area) by the zooming tracking processing according to this embodiment. FIG. 5 is a flowchart of the control method according to this embodiment.

First, in step S500, the lens microcomputer 111 starts the processing. In step S501, the lens microcomputer 111 acquires the position data of the zoom lens 102 (zoom lens position) using a signal detected by the position detection sensor of the zoom lens position detection unit 106. In step S502, the lens microcomputer 111 determines whether or not the zoom operation is performed by comparing the previously acquired zoom lens position and the zoom lens position detected in the step S501. If the zoom operation is performed in the step S502, the processing proceeds to step S503. On the other hand, if the zoom operation is not performed, the processing returns to the step S501.

In the step S503, the lens microcomputer 111 calculates a target focus lens position to maintain the object distance at the current zoom lens position on the basis of the electronic cam data (tracking curve) showing the relation between the zoom lens position and the focus lens position. The electronic cam data is stored in the memory of the lens microcomputer 111, for example.

Figure 6:
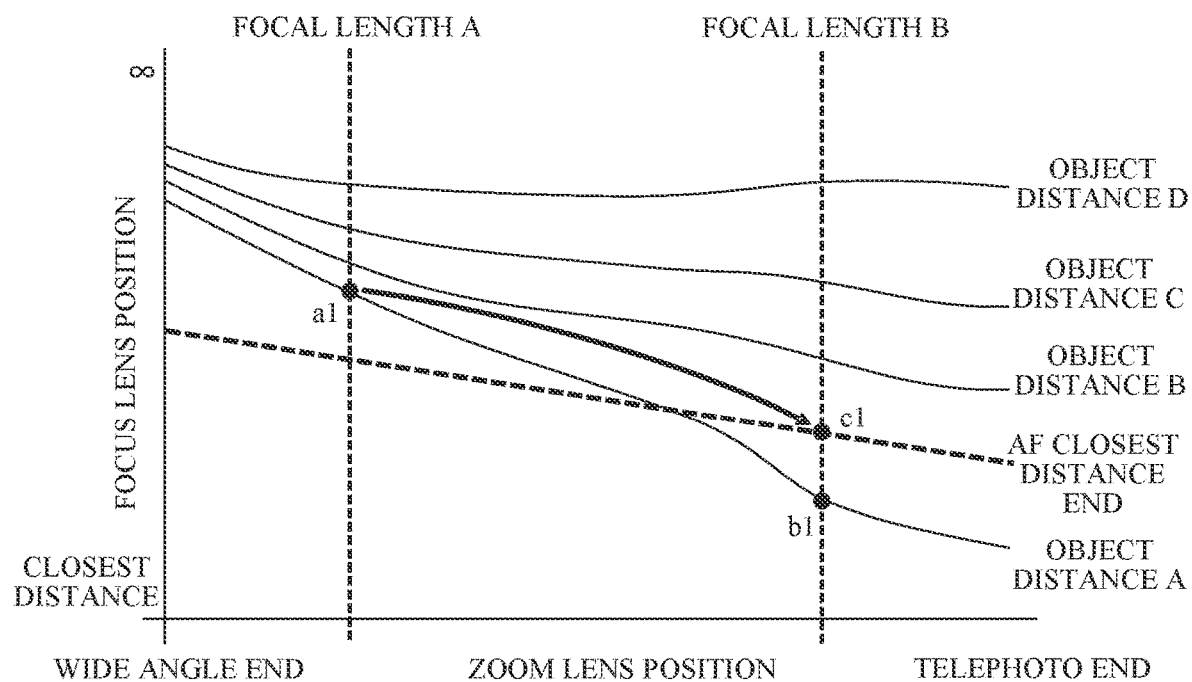
FIG. 6 is an explanatory diagram of the control method according to the first embodiment.

Here, referring now to FIG. 6, a description will be given of the target focus lens position to maintain the object distance. FIG. 6 is an explanatory diagram of the control method according to this embodiment and shows the focus control to maintain the AF available area when the focus lens position before the zoom tracking processing is positioned in the AF available area. In FIG. 6, the ordinate axis denotes the focus lens position, and the abscissa axis denotes the zoom lens position. As illustrated in FIG. 6, it is assumed that the current focus lens position a1 is on the electronic cam at the object distance A. At this time, when the zoom lens position moves from the focal length A to the focal length B by performing the zoom operation, the target focus lens position to maintain the object distance A becomes b1.

In step S504 of FIG. 5, the lens microcomputer 111 determines whether or not the target focus lens position calculated in the step S503 is in the MF exclusive area at the current zoom lens position. The memory of the lens microcomputer 111 stores closest distance end data (AF closest distance end) of the AF available area at each zoom lens position. Thus, the lens microcomputer 111 can determine whether the target focus lens position is in the AF available area or the MF exclusive area depending on whether the target focus lens position is closer to a closest distance side or an infinite side than the AF closest distance end. As illustrated in FIG. 6, the target focus lens position b1 is closer to the closest distance side than the AF closest distance end. Thus, the target focus lens position b1 is determined to be the MF exclusive area.

In step S505, the lens microcomputer 111 determines whether the current focus lens position is in the AF available area or the MF exclusive area depending on whether the current focus lens position is closer to the closest distance side or the infinite side than the AF closest distance end. In the step S505, if it is determined that the current focus lens position is in the AF available area, the processing proceeds to step S507. In the step S507, the lens microcomputer 111 (third controller 111c) outputs the control command to the focus lens control unit 109 to drive the focus lens 105 to the AF closest distance end. As illustrated in FIG. 6, the current focus lens position a1 is closer to the infinite side than the AF closest distance end. Thus, the lens microcomputer 111 determines that the current focus lens position a1 is in the AF available area and drives the focus lens 105 to the AF closest distance end c1 to maintain the AF available area. That is, when the MF exclusive area changes so that the position of the focus lens is included in the MF exclusive area to maintain the object distance while the focus lens is positioned in the AF available area, the third controller 111c drives the focus lens so that the focus lens is positioned in the AF available area.

If it is determined in the step S504 that the target focus lens position is in the AF available area, the processing proceeds to step S506. In the step S506, the lens microcomputer 111 (third controller 111c) outputs the control command to the focus lens control unit 109 to drive the focus lens 105 to the target focus position. That is, when the MF exclusive area changes so that the position of the focus lens is included in the AF available area to maintain the object distance while the focus lens is positioned in the AF available area, the third controller 111c drives the focus lens to maintain the object distance. Further, when the MF exclusive area changes so that the position of the focus lens is included in the AF available area to maintain the object distance while the focus lens is positioned in the MF exclusive area, the third controller 111c drives the focus lens to maintain the object distance.

Figure 7:
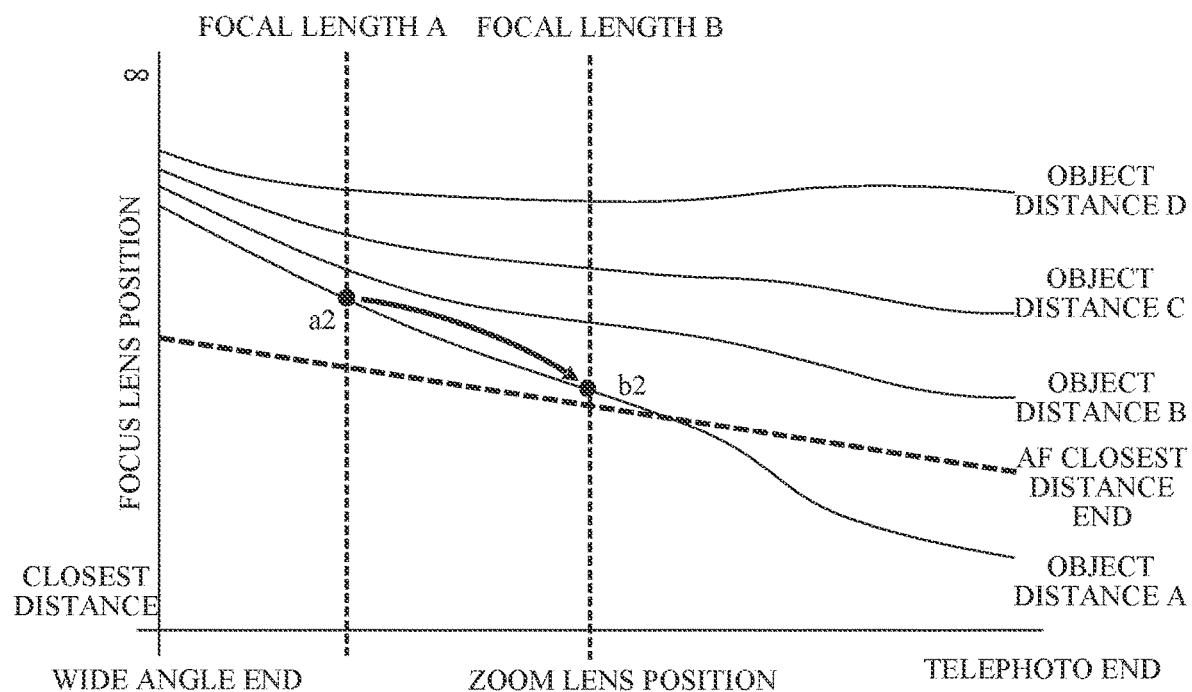
FIG. 7 is an explanatory diagram of the control method according to the first embodiment.

FIG. 7 is an explanatory diagram of the control method according to this embodiment and shows the focus control to maintain the object distance when the focus lens position before the zoom tracking processing is in the AF available area. In FIG. 7, the ordinate axis denotes the focus lens position, and the abscissa axis denotes the zoom lens position. As illustrated in FIG. 7, the targe focus lens position b2 is closer to the infinite side than the AF closest distance end. Thus, the lens microcomputer 111 determines that the target focus lens position b2 is in the AF available area and drives the focus lens 105 from the current focus lens position a2 to the target focus position b2 to maintain the object distance.

If it is determined in the step S505 that the current focus lens position is in the MF exclusive area, the processing proceeds to the step S506. In the step S506, the lens microcomputer 111 outputs the control command to the focus lens control unit 109 and drives the focus lens 105 to the target focus lens position.

Figure 8:
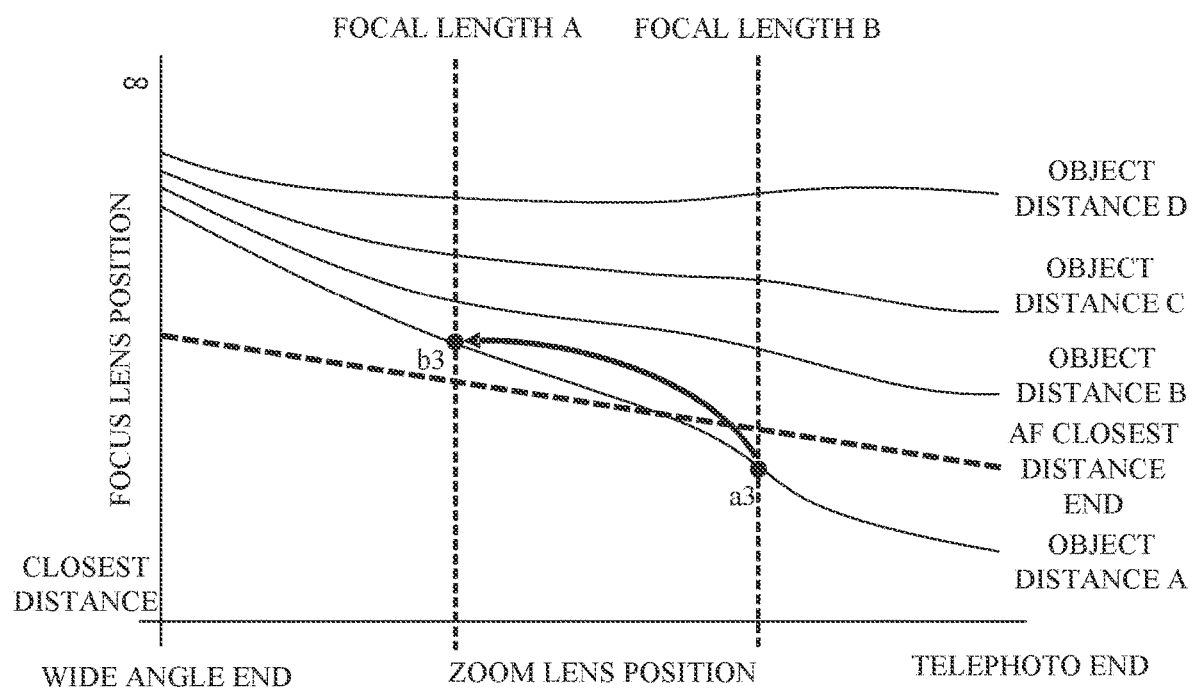
FIG. 8 is an explanatory diagram of the control method according to the first embodiment.

FIG. 8 is an explanatory diagram of the control method according to this embodiment and shows the focus control to maintain the object distance when the focus lens position before the zoom tracking processing is in the MF exclusive area. In FIG. 8, the ordinate axis denotes the focus lens position, and the abscissa axis denotes the zoom lens position. As illustrated in FIG. 8, the current focus lens position a3 is closer to the closest distance side than the AF closest distance end. Thus, the lens microcomputer 111 determines that the current focus lens position a3 is in the MF exclusive area and drives the focus lens 105 to the target focus position b3 to maintain the object distance.

In this embodiment, the MF exclusive area changes according to the position of the zoom lens. In this embodiment, when the position of the zoom lens is at the wide angle end (WIDE), the MF exclusive area has a first size, and when the position of the zoom lens is at the telephoto end (TELE), the MF exclusive area has a second size smaller than the first size. However, this embodiment is not limited to this, and the relation between the position of the zoom lens (wide angle end and telephoto end) and the size of the MF exclusive area (first size and second size) may be reversed.

As described above, in this embodiment, when the target focus lens position to maintain the object distance by the zoom tracking processing is in the MF exclusive area while the current focus lens position is in the AF available area, the lens microcomputer 111 restrict the movement of the focus lens 105. That is, in this case, the lens microcomputer 111 prohibits the movement of the focus lens 105 from the AF available area to the MF exclusive area except by the user's MF operation. This can prevent the focus lens 105 from unintentionally moving from the AF available area to the MF exclusive area. Meanwhile, when the focus lens position (current focus lens position) before the zoom tracking processing is in the MF exclusive area, the focus lens 105 is moved to the target focus lens position to maintain the object distance. As a result, the focusing state of the object can be maintained, and user operability can be improved.

Second Embodiment

Next, a description will be given of a second embodiment of the present invention. In this embodiment, to prevent switching from the AF available area to the MF exclusive area by the zoom tracking processing according to the first embodiment, the flow of the focus lens control by the zoom tracking processing after driving the focus lens 105 to the AF closest distance end is explained.

Figure 9:
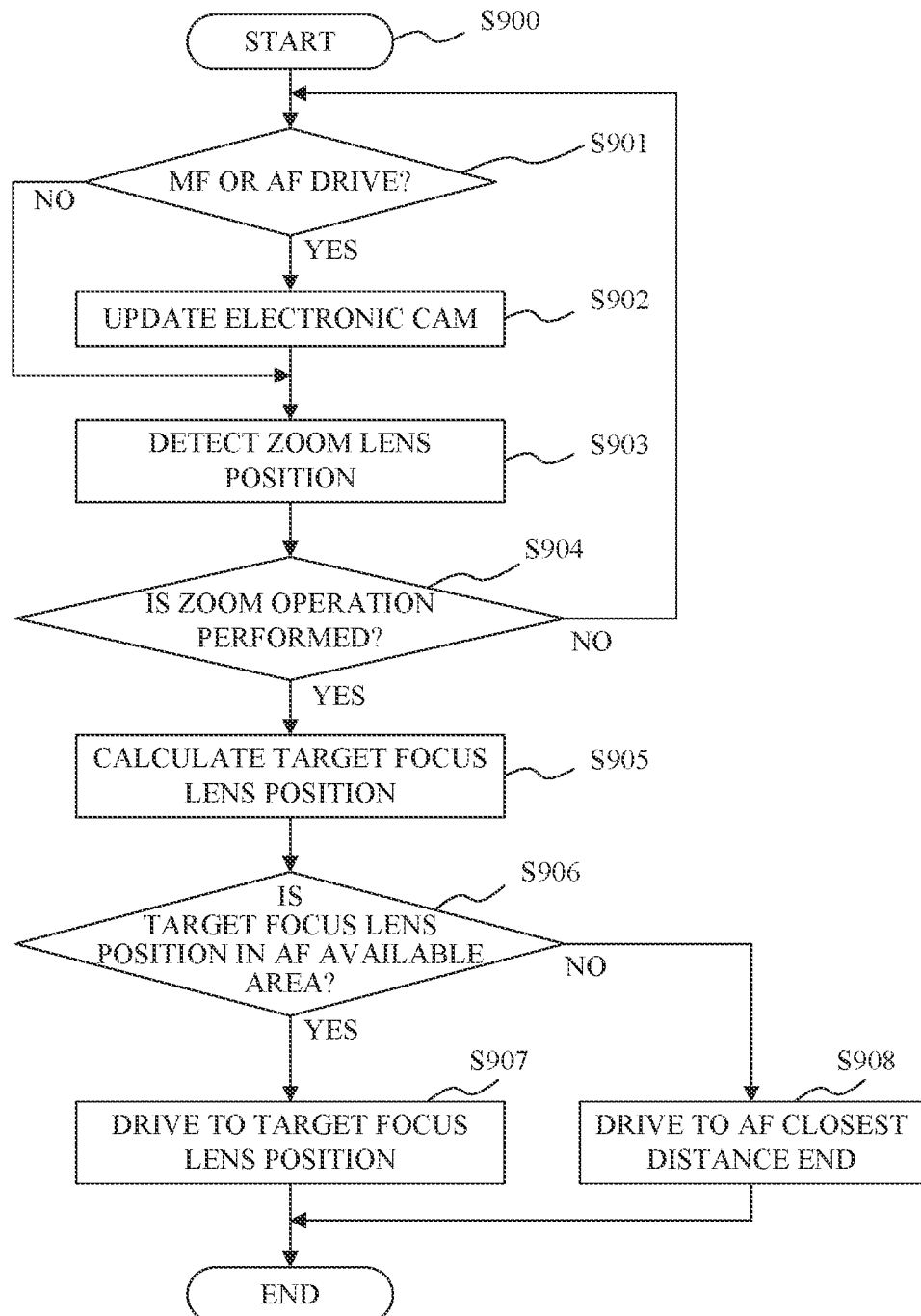
FIG. 9 is a flowchart of a control method according to the second embodiment.

Here, referring now to FIG. 9, a description will be given of the flow of the focus lens control (control method) by the zoom tracking processing after driving the focus lens 105 to the AF closest distance end. FIG. 9 is a flowchart of the control method according to this embodiment.

First, in step S900, the lens microcomputer 111 starts the processing after driving the focus lens 105 to the AF closest distance end. Subsequently, in step S901, the lens microcomputer 111 determines whether or not the MF drive or AF drive is performed. Here, the MF drive is the drive of the focus lens 105 based on the operation of the operation ring 110 by the user, and the AF drive is the drive of the focus lens 105 based on the control command regarding focusing transmitted from the camera microcomputer 206.

If it is determined in the step S901 that the MF drive or the AF drive is performed, the processing proceeds to step S902. In the step S902, the lens microcomputer 111 updates the electronic cam corresponding to the current positions of the zoom lens 102 and the focus lens 105 from the electronic cam data (tracking curve) showing the relation between the zoom lens position and the focus lens position stored in the memory. Next, in step S903, the lens microcomputer 111 acquires the position data of the zoom lens 102 (zoom lens position) using a signal detected by the position detection sensor of the zoom lens position detection unit 106. Subsequently, in step S904, the lens microcomputer 111 determines whether or not the zoom operation is performed by comparing the previously acquired zoom lens and the zoom lens position detected in the step S903. If the zoom operation is performed in the step S904, the processing proceeds to step S905. On the other hand, if the zoom operation is not performed, the processing returns to the step S901, and the lens microcomputer 111 detects the MF drive or the AF drive and the zoom lens position.

In the step S905, the lens microcomputer 111 calculates the target focus lens position to maintain the object distance at the current zoom lens position. The target focus lens position is calculated on the basis of the electronic cam data (tracking curve) showing the relation between the zoom lens position and the focus lens position stored in the memory and the currently held electronic cam information.

Subsequently, in step S906, the lens microcomputer 111 determines whether or not the target focus lens position calculated in the step S905 is in the AF available area at the current zoom lens position. The memory of the lens microcomputer 111 stores the closest distance end data (AF closest distance end) of the AF available area at each zoom lens position. Thus, the lens microcomputer 111 can determine whether the target focus lens position is in the AF available area or the MF exclusive area depending on whether the target focus lens position is closer to the closest distance side or the infinite side than the AF closest distance end.

If it is determined in the step S906 that the target focus lens position is in the AF available area, the processing proceeds to step S907. In the step S907, the lens microcomputer 111 outputs the control command to the focus lens control unit 109 to drive the focus lens 105 to the target focus position. On the other hand, if it is determined in the step S906 that the target focus lens position is in the MF exclusive area, the processing proceeds to step S908. In the step S908, the lens microcomputer 111 outputs the control command to the focus lens control unit 109 to drive the focus lens 105 to the AF closest distance end.

Figure 10:
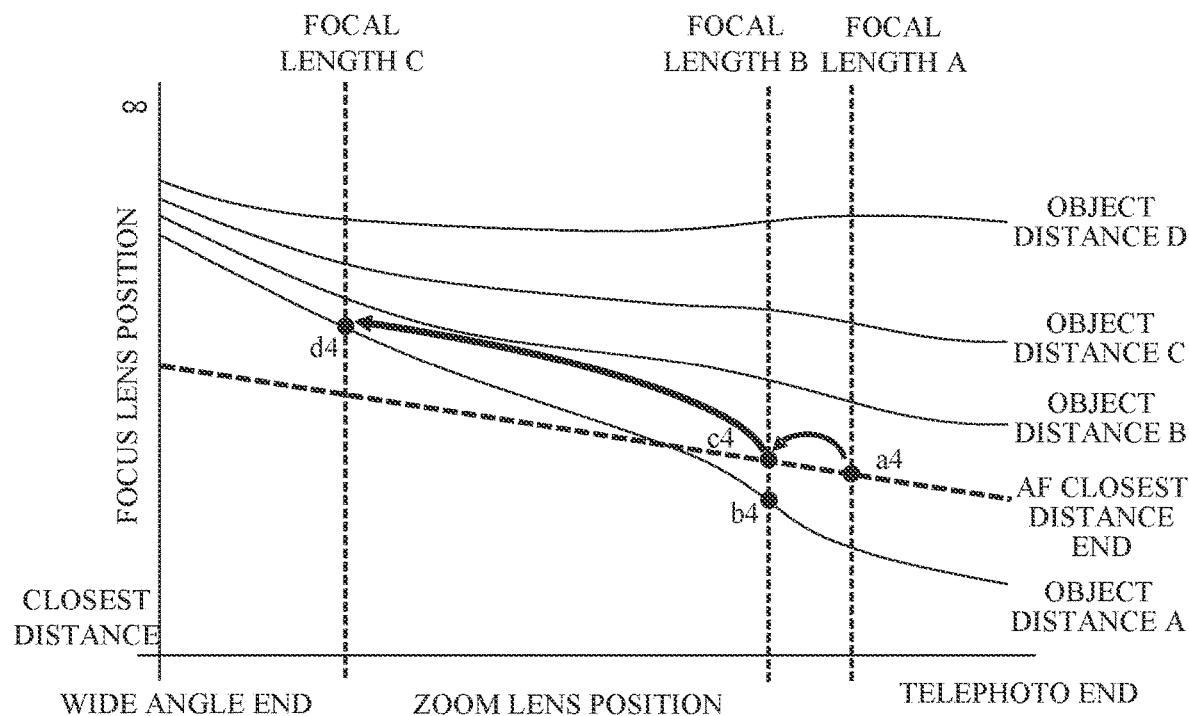
FIG. 10 is an explanatory diagram of the control method according to the first embodiment.

FIG. 10 is an explanatory diagram of the control method according to this embodiment and shows the focus control for returning to the object distance when the focus lens position (current focus lens position) before the zoom tracking processing in the AF available area. In FIG. 10, the ordinate axis denotes the focus lens position, and the abscissa axis denotes the zoom lens position.

As illustrated in FIG. 10, when the held electronic cam is the electronic cam corresponding to the object distance A and the zoom operation is performed so that the zoom lens position is driven from the focal length A to the focal length B, the target focus lens position to maintain the object distance A becomes b4. Since the target focus lens position b4 is closer to the closest distance side than the AF closest distance end, the target focus lens position b4 is determined to be positioned in the MF exclusive area. Thus, the lens microcomputer 111 drives the focus lens 105 to the AF closest distance end c4 so that the focus lens 105 is positioned in the AF available area.

When the zoom operation is further performed so that the zoom lens position moves from the focal length B to the focal length C, the target focus lens position to maintain the object distance A becomes d4. Since the target focus lens position d4 is closer to the infinite side than AF closest distance end, the target focus lens position d4 is determined to be positioned in the AF available area. Thus, the lens microcomputer 111 drives the focus lens 105 to the target focus lens position d4 to return to the held object distance.

In this embodiment, when the focus lens target position to maintain the object distance changes from the MF exclusive area to the AF available area after driving the focus lens 105 to the AF closest distance end, the focus lens 105 is driven to the target focus lens position to maintain the previous object distance. As a result, it is possible to restore the focusing state of the object while preventing switching from the AF available area to the MF exclusive area by the zoom tracking processing, and it is possible to improve user operability.

Third Embodiment

Next, a description will be given of the third embodiment of the present invention. In the interchangeable lens 100 according to this embodiment, when the luminous flux reaching the phase difference AF sensor of the image sensor 201 becomes smaller due to the aperture unit 103 that limits the light quantity of the object image, the accuracy of the AF evaluation value decreases and there is an area (AF disable area) where high-precision AF cannot be realized. In this embodiment, the area where high-precision AF cannot be realized due to the influence of the aperture unit 103 is defined as the MF exclusive area.

Figure 11:
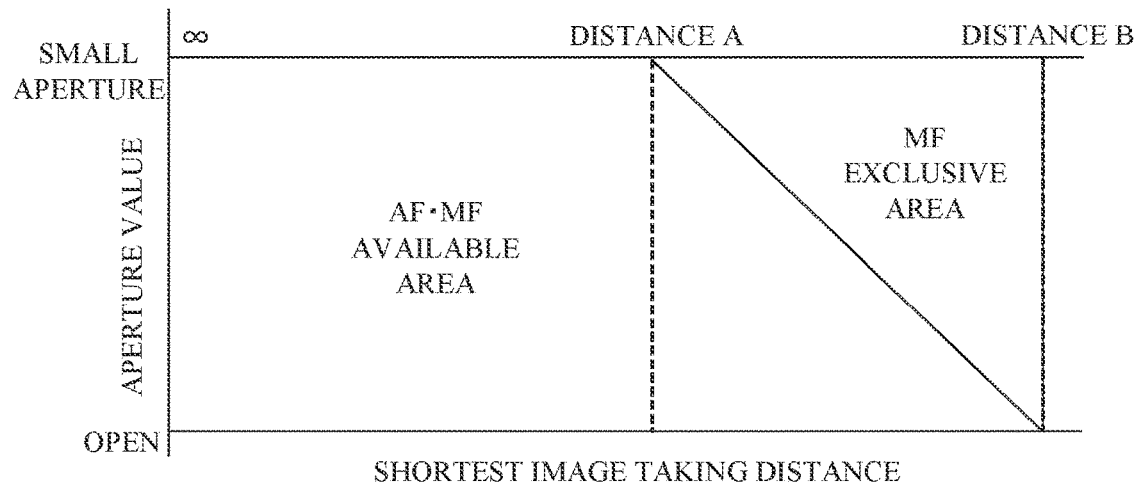
FIG. 11 illustrates a relation between an aperture value and the shortest image taking distance according to the first embodiment.

FIG. 11 is a diagram showing the relation between the aperture value (F value) and the shortest image taking distance. In FIG. 11, the ordinate axis denotes the aperture value, and the abscissa axis denotes the shortest image taking distance. As illustrated in FIG. 11, the shortest image taking distance changes according to the aperture value, and the shooting distance position that is in the AF available area on the open side will be positioned in the MF exclusive area on the small aperture side. As described above, in this embodiment, the AF available area (AF/MF available area) and the MF exclusive area are switched according to the aperture value.

Figure 12:
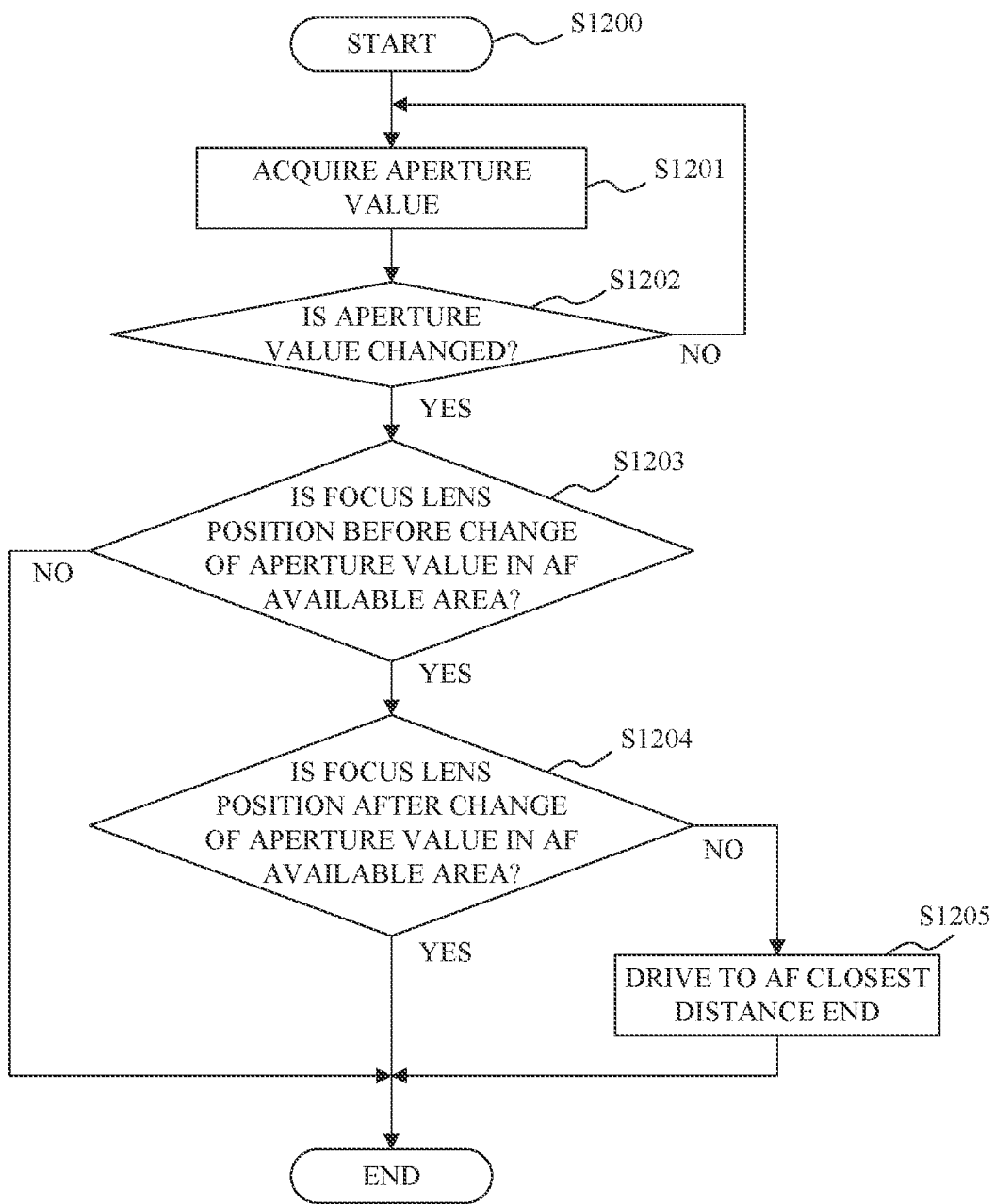
FIG. 12 is a flowchart of a control method according to the third embodiment.

Here, referring now to FIG. 12, a description will be given of the flow of the focus lens control (control method) according to this embodiment when switching between the AF available area and the MF exclusive area due to changes in the aperture value. FIG. 12 is a flowchart of the control method according to this embodiment.

First, in step S1200, the lens microcomputer 111 starts processing. Next, in step S1201, the lens microcomputer 111 acquires the aperture value set according to the control command transmitted from the camera body 200. Subsequently, in step S1202, the lens microcomputer 111 determines whether or not the aperture value is changed by comparing the previously acquired aperture value with the aperture value acquired in the step S1201. If it is determined in the step S1202 that the aperture value is changed, the processing proceeds to step S1203. On the other hand, if it is determined that the aperture value is not changed, the processing returns to the step S1201 and the lens microcomputer 111 acquires the aperture value.

In the step S1203, the lens microcomputer 111 determines whether or not the focus lens position before the change of the aperture value is in the AF available area. The lens microcomputer 111 stores the closest distance end data (AF closest distance end) of the AF available area at each aperture value in the memory. The lens microcomputer 111 determines whether the focus lens position before the change of the aperture value is in the AF available area or the MF exclusive area depending on whether the focus lens position before the change of the aperture value is closer to the closest distance side or the infinite side than the AF closest distance end.

Figure 13:
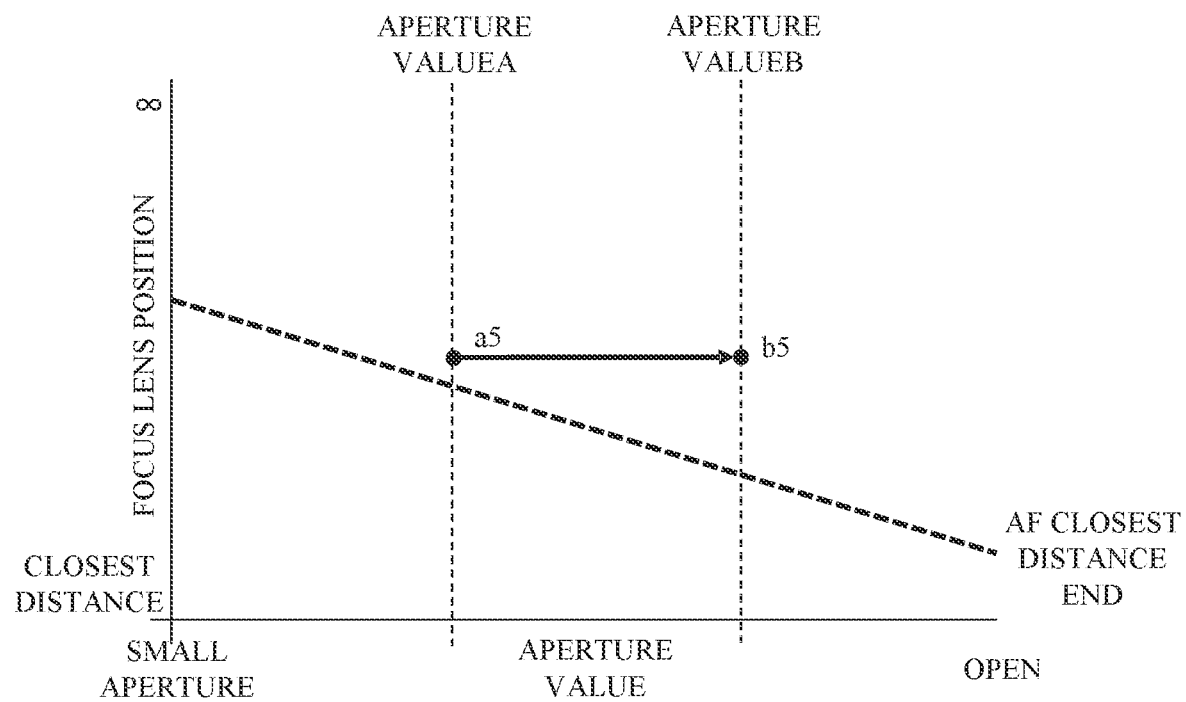
FIG. 13 is an explanatory diagram of the control method according to the third embodiment.

FIG. 13 is an explanatory diagram of the control method according to this embodiment and shows the focus control to maintain the object distance when the focus lens position before the change of the aperture value is in the AF available area. In FIG. 13, the ordinate axis denotes the focus lens position, and the abscissa axis denotes the aperture value. As illustrated in FIG. 13, when the aperture value is changed from the aperture value A to the aperture value B, the focus lens position a5 before the change of the aperture value (aperture value A) is closer to the infinite side than the AF closest distance end. Thus, the lens microcomputer 111 determines that the focus lens position a5 before the change of the aperture value is in the AF available area.

If it is determined in the step S1203 that the focus lens position before the change of the aperture value is in the AF available area, the processing proceeds to step S1204. In the step S1204, the lens microcomputer 111 determines whether or not the focus lens position after the change of the aperture value is in the AF available area. The lens microcomputer 111 determines whether the focus lens position after the change of the aperture value is in the AF available area or the MF exclusive area depending on whether the focus lens position after the change of the aperture value is closer to the closest distance side or the infinite side than the AF closest distance end. As illustrated in FIG. 13, the focus lens position b5 after the change of the aperture value (aperture value B) is closer to the infinite side than the AF closest distance end. Thus, the lens microcomputer 111 determines that the focus lens position b5 after the change of the aperture value is in the AF available area and maintains the object distance without driving the focus lens 105.

If it is determined in the step S1203 that the focus lens position before the change of the aperture value is in the MF exclusive area, the lens microcomputer 111 does not drive the focus lens 105.

Figure 14:
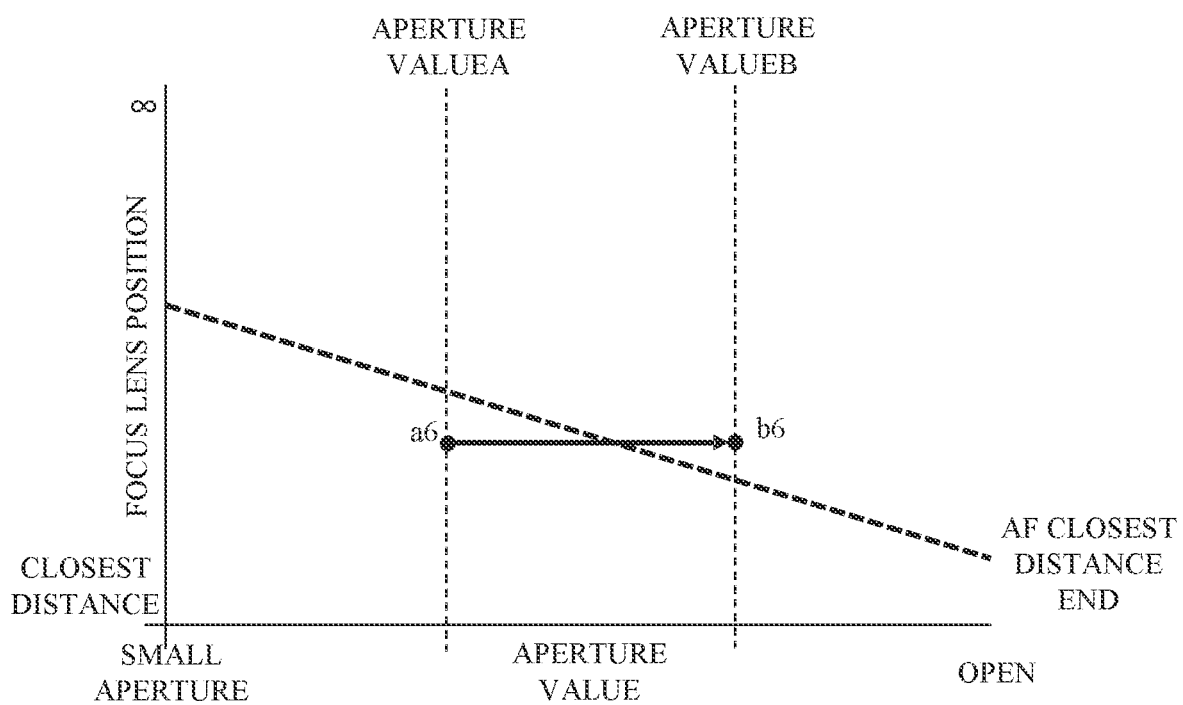
FIG. 14 is an explanatory diagram of the control method according to the third embodiment.

FIG. 14 is an explanatory diagram of the control method according to this embodiment and shows the focus control to maintain the object distance when the focus lens position before the change of the aperture value is in the MF exclusive area. In FIG. 14, the ordinate axis denotes the focus lens position, and the abscissa axis denotes the aperture value. As illustrated in FIG. 14, the focus lens position a6 before the change of the aperture value is closer to the closest distance side than the AF closest distance end. Thus, the lens microcomputer 111 determines that the focus lens position a6 before the change of the aperture value is in the MF exclusive area, and maintains the object distance without driving the focus lens 105.

If it is determined in the step S1204 that the focus lens position after the change of the aperture value is in the MF exclusive area, the processing proceeds to step S1205. In the step S1205, the lens microcomputer 111 outputs the control command to the focus lens control unit 109 to drive the focus lens 105 to the AF closest distance end.

Figure 15:
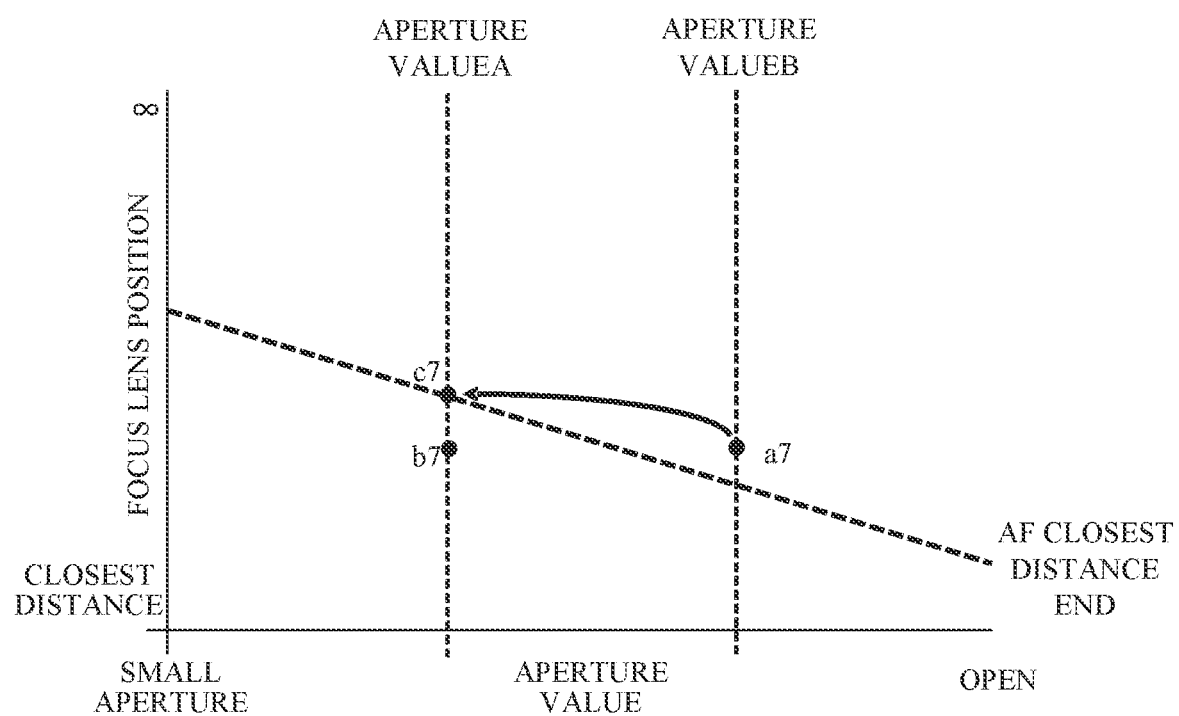
FIG. 15 is an explanatory diagram of the control method according to the third embodiment.

FIG. 15 is an explanatory diagram of the control method according to this embodiment and shows the focus control to maintain the AF available area when the focus lens position before the change of the aperture value is in the AF available area. In FIG. 15, the ordinate axis denotes the focus lens position, and the abscissa axis denotes the aperture value. As illustrated in FIG. 15, the focus lens position b7 after the change of the aperture value is closer to the closest distance side than the AF closest distance end. Thus, the lens microcomputer 111 determines that the focus lens position b7 after the change of the aperture value is in the MF exclusive area and maintains the AF available area by driving the focus lens 105 to the AF closest distance end c7.

As described above, in this embodiment, the MF exclusive area is changed according to the aperture value (F value). In this embodiment, when the aperture value is a first aperture value (small aperture state), the MF exclusive area has a third size, when the aperture value is a second aperture value (open state) smaller than the first aperture value, the MF exclusive area has a fourth size smaller than the third size. However, this embodiment is not limited to this, and the relation between the aperture value position of the zoom lens (wide angle end and telephoto end) and the size of the MF exclusive area (third size and fourth size) may be reversed.

In this embodiment, when the focus lens position, which is in the AF available area before the change of the aperture value, is switched to be in the MF exclusive area, the focus lens 105 is controlled so that the focus lens position is not switched to be in the MF exclusive area from the AF available area except by the user's MF operation. That is, the lens microcomputer 111 can prevent from unintentionally user's switching to the MF exclusive area by driving the focus lens 105 to a range of the AF available area. On the other hand, when the focus lens position before the change of the aperture value is in the MF exclusive area, the lens microcomputer 111 does not drive the focus lens 105, so that it is possible to maintain the focusing state of the object and to improve user operability.

In the first to third embodiments, the lens microcomputer 111 performs functions as the first controller 111a, the second controller 111b, and the third controller 111c, but is not limited thereto. For example, the camera microcomputer 206 as the control apparatus may be configured to perform at least one function of the first controller, the second controller, or the third controller.

According to the first to third embodiments, the control apparatus that prevents switching from the AF available area to the MF exclusive area unintended by the user to improve user operability, a lens apparatus, an imaging apparatus, a control method, and a non-transitory computer-readable storage can be provided.

Next, referring now to figures, a description will be given of fourth to sixth embodiments. The configurations assigned in the first to third embodiments are explained in the first to third embodiments, and thus the description thereof will be omitted.

Figure 16:
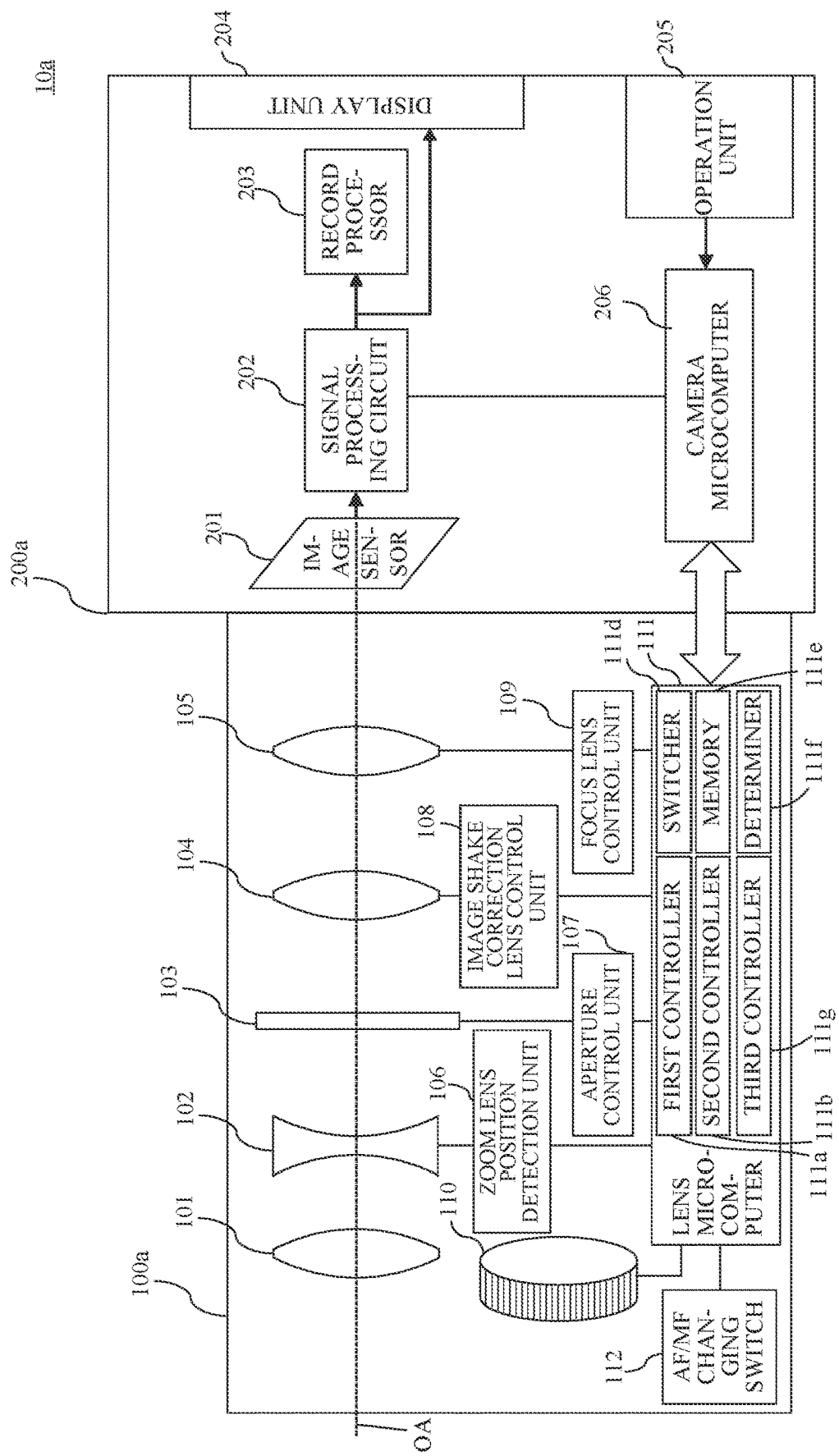
FIG. 16 is a block diagram of an imaging apparatus according to fourth to sixth embodiments.

First, a description will be given of a configuration of an imaging apparatus according to the fourth to sixth embodiments. FIG. 16 is a block diagram of an imaging apparatus 10a. The imaging apparatus 10a includes a camera body (imaging apparatus body) 200a and an interchangeable lens (lens apparatus) 100a that can be attached to and detached from the camera body 200. However, the imaging apparatus according to the fourth to sixth embodiments is not limited to this, and the camera body and the lens apparatus may be integrally configured.

The interchangeable lens 100a is mechanically and electrically connected to the camera body 200a through a mount (not illustrated). The interchangeable lens 100a receives power from the camera body 200a through a power supply terminal (not illustrated) provided on the mount described above. The interchangeable lens 100a controls various actuators and the lens microcomputer 111, which will be described later, by using the power received from the camera body 200a. The camera body 200a performs communication with the interchangeable lens 100a through a communication terminal (not illustrated) provided on the mount described above and sends a control command to the interchangeable lens 100 to control the interchangeable lens 100a.

The camera body 200a includes the image sensor 201 having the phase difference AF sensor function, the signal processing circuit 202, the record processor 203, the display unit 204, the operation unit 205, and the camera microcomputer 206.

The interchangeable lens 100a includes an image pickup optical system, control units that respectively control each actuator driving the image pickup optical system, the operation ring 110 to operate the focus lens 105, and the lens microcomputer 111.

The lens microcomputer 111 has also a function to transit the interchangeable lens 100a from an Activity mode (first power mode), which is a normal operating state, to a Sleep mode (second power mode), which is a low power consumption state, by a Sleep command from the camera body 200a. The Sleep mode is a state that the power supply of a peripheral circuit of the interchangeable lens 100a is cut off, a clock oscillation circuit of the lens microcomputer 111 is stopped, the low power consumption state is realized, and the operation is stopped. The interchangeable lens 100a in the Sleep state transits to the Active mode by a Sleep cancellation instruction from the camera body 200a and performs the normal operation such as control of the focus lens 105 and the aperture unit 103, which will be described later and control of the image shake correction lens 104 (camera shake correction).

In the fourth to sixth embodiments, the lens microcomputer 111 has the first controller 111a, the second controller 111b, a third controller 111g, a switcher 111d, memory 111e, and a determiner 111f. The first controller 111a automatically adjusts the focus lens 105 to a focusing position (that is, the first controller 111a has the function of realizing AF control). The second controller 111b manually adjusts the focus lens 105 (on the basis of the user operation quantity) (that is, the second controller 111b has the function of realizing MF control). The third controller 111g drives the focus lens 105 (zoom tracking control, etc.). The switcher 111d switches between the first power mode (Active mode) and the second power mode (Sleep mode) with less power consumption than the first power mode. The memory 111e is an internal memory of the lens microcomputer 111, and stores information regarding a first position of the focus lens 105 (the position of the focus lens 105 in switching) upon switching from the first power mode to the second power mode.

The third controller 111gc is a function of driving or stopping the focus lens 105 to position the focus lens 105 in a proper position when switching between the first power mode and the second power mode.

In the fourth to sixth embodiments, an example in which the lens microcomputer 111 has the first controller 111a, the second controller 111b, and the third controller 111g has been described. This can be regarded as equivalent to the fact that the lens microcomputer 111 has a function corresponding to the function of the first controller 111a, a function corresponding to the function of the second controller 111b, and a function corresponding to the function of the third controller 111g.

As described above, the first controller 111a and the second controller 111b effectively work in the first drive area (AF available area) of the focus lens 105, and the first controller 111a is disabled in the second drive area (MF exclusive area) of the focus lens 105. The third controller 111g drives the focus lens 105 on the basis of changes of the second drive area (increase/decrease changes in ratio of the second drive area to the entire drive area). The third controller 111g moves the focus lens 105 to a second position upon switching from the second power mode to the first power mode when the first position of the focus lens 105 in in the first drive area upon switching from the first power mode to the second power mode. That is, the third controller 111g moves the focus lens 105 to the second position in the first drive area on the basis of the information regarding the first position stored in the memory 111e.

Preferably, a third controller 111g moves the focus lens 105 to the second position on the basis of the information regarding the first position stored in the memory 111e upon switching from the second power mode to the first power mode when the zoom lens moves in the second power mode. Also, preferably, the third controller 111g moves the focus lens 105 to maintain the object distance upon switching from the second power mode to the first power mode when the first position of the focus lens 105 in in the second drive area upon switching from the first power mode to the second power mode. More preferably, the third controller 111g does not moves the focus lens 105 upon switching from the second power mode to the first power mode when the first position in in the second drive area upon switching from the first power mode to the second power mode. Further preferably, the determiner 111f determines whether the position of the focus lens 105 in in the first drive area or the second drive area on the basis of the positions of the zoom lens 102 and the focus lens 105 stored upon switching from the first power mode to the second power mode. Furthermore preferably, the memory 111e stores the electric cam data showing the relation between the positions of the zoom lens 102 and the focus lens 105 to maintain the focusing state according to the object distance. Moreover, preferably, the focus lens 105 is not driven (electrically) by the focus lens control unit 109 when the zoom lens 102 is moved in the second power mode.

An AF/MF changing switch (selector) 112 selects the first controller 111a or the second controller 111b as a focus adjustment means for performing focusing described later. The lens microcomputer 111 sets the first controller 111a or the second controller 111b as the focus adjustment means on the basis of a state of the AF/MF changing switch 112. Preferably, the third controller 111g moves the focus lens 105 to maintain the object distance upon starting up in the first power mode at power-on when the second controller 111b is selected by the AF/MF changing switch 112.

Hereinafter in the fourth to sixth embodiments, a description will be given of a control method of the imaging apparatus 10a.

Fourth Embodiment

First, a description will be given of the fourth embodiment of the present invention. The relation between the zoom lens position and the shortest image taking distance is the same as the first embodiment described using FIG. 4.

Figure 17:
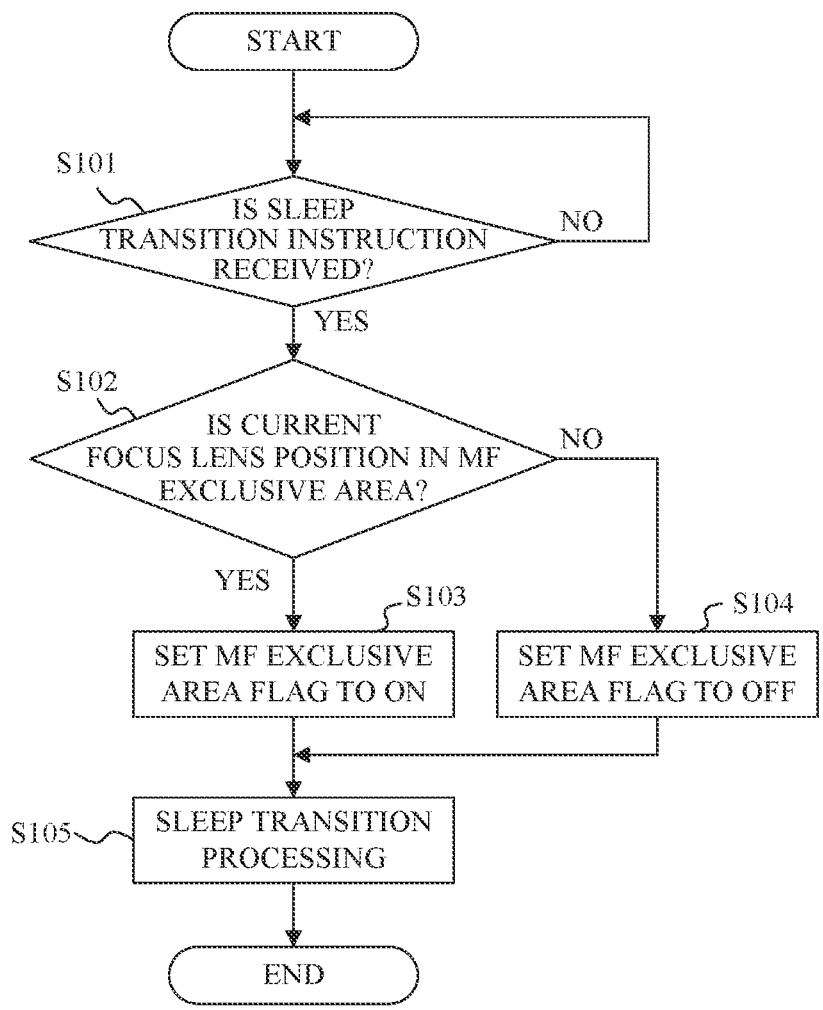
FIG. 17 is a flowchart of a control method in Sleep transition according to the fourth embodiment.

Next, referring now to FIG. 17, a description will be given of the control method of the imaging apparatus 10a in Sleep transition. FIG. 17 is a flowchart of the control method in Sleep transition and shows processing in transition to the Sleep state after the interchangeable lens 100a, which is in the Active state, receives a Sleep transition instruction from the camera body 200a.

When the processing starts, first, in step S101, the lens microcomputer 111 determines whether or not the Sleep transition instruction is received from the camera body 200a. If the Sleep transition instruction is not received in the step S101, the lens microcomputer 111 repeats the determination in the step S101. On the other hand, when the Sleep transition instruction is received, the processing proceeds to step S102.

In step S102, the lens microcomputer 111 determines whether or not the current focus lens position is in the MF exclusive area. If the current focus lens position is in the MF exclusive area, the processing proceeds to step S103. In the step S103, the lens microcomputer 111 set a MF exclusive area flag (MF exclusive area flag information) to ON, and the processing proceeds to step S105. On the other hand, if the current focus lens position is not in the MF exclusive area, the processing proceeds to step S104. In the step S104, the lens microcomputer 111 set the MF exclusive area flag to OFF, and the processing proceeds to the step S105.

In step S105, the lens microcomputer 111 performs Sleep transition processing. That is, the lens microcomputer 111 sets the interchangeable lens 100a to the low power consumption state by turning off the internal power supply and stopping the clock oscillation of the lens microcomputer 111 as processing to transit to the Sleep state. At that time, the lens microcomputer 111 stores necessary information such as the current position information of the focus lens 105, the MF exclusive area flag information, and the position information of the zoom lens 102, and the like to the memory 111e, which can store information in the Sleep state. As a result, even when the lens microcomputer 111 transits to the Sleep state, the necessary information in the Sleep state can be stored.

Figure 18:
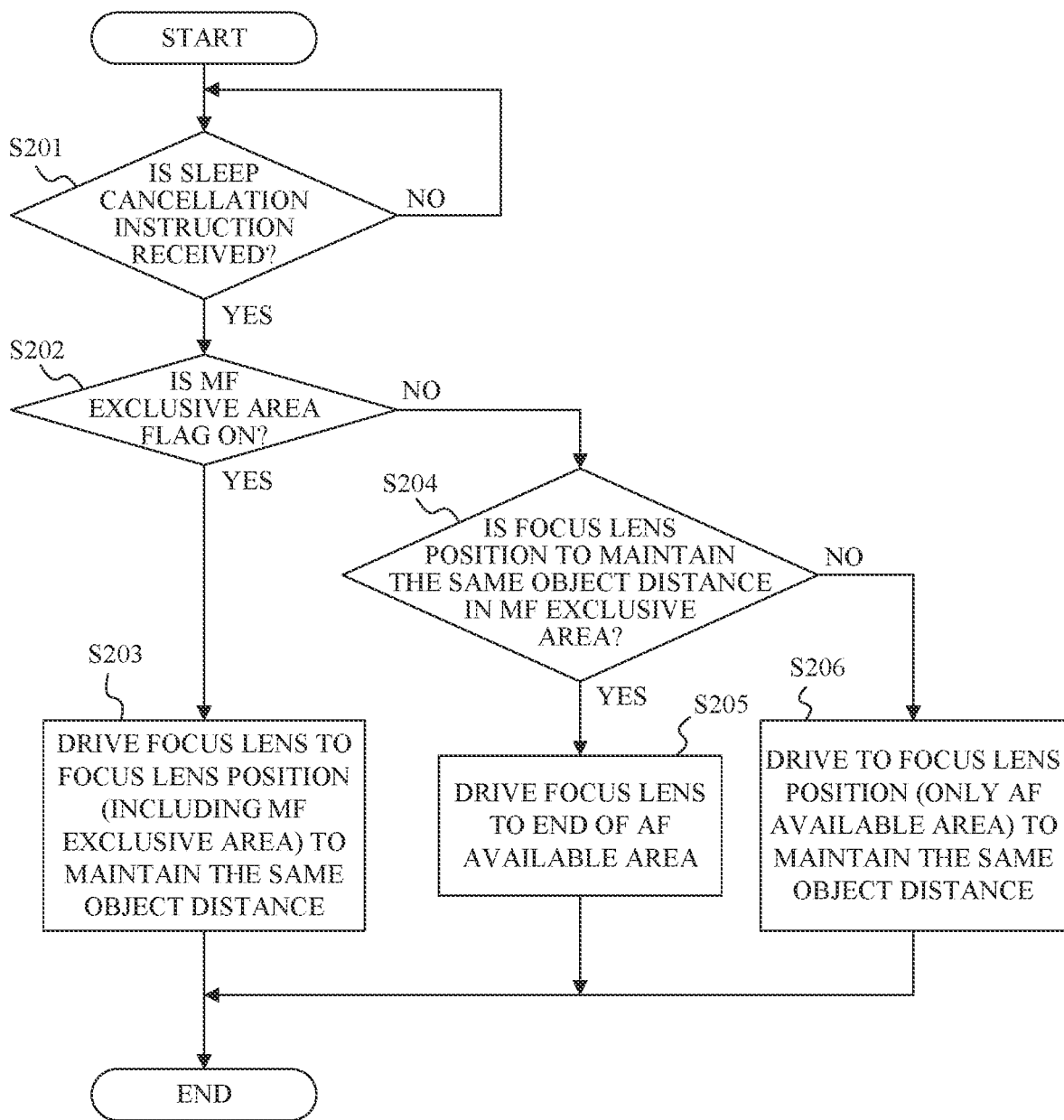
FIG. 18 is a flowchart of a control method at the time of Sleep cancellation according to the fourth embodiment.

Next, referring now to FIG. 18, a description will be given of the control method of the imaging apparatus 10a in Sleep release. FIG. 18 is a flowchart of the control method in Sleep release and shows processing in transition to the Active state after the interchangeable lens 100a, which is in the Sleep state, receives a Sleep cancellation instruction from the camera body 200a.

First, in step S101, the lens microcomputer 111, which is in the Sleep state and stops the processing, determines whether or not the Sleep cancellation instruction is received from the camera body 200a. If the Sleep cancellation instruction is not received from the camera body 200a, the lens microcomputer 111 repeats the determination in the step S201. On the other hand, when the Sleep cancellation instruction is received from the camera body 200a, the processing proceeds to step S202.

In the step S202, the lens microcomputer 111 determines whether or not the MF exclusive area flag stored in the memory 111e in Sleep transition is ON. If the MF exclusive area flag is ON, that is, it is assumed that the user has performed the MF operation, the processing proceeds to step S203. On the other hand, if the MF exclusive area flag is OFF, the processing proceeds to step S204.

In the step S203, the lens microcomputer 111 calculates the object distance in Sleep transition on the basis of the position information of the focus lens 105 stored in the memory 111e in Sleep transition, the position information of the zoom lens 102, and the electronic cam data. Also, the lens microcomputer 111 detects the zoom lens position using the position detection sensor of the zoom lens position detection unit 106 and calculates the focus lens position to maintain the object distance in Sleep transition at the current zoom lens position.

Figure 19:
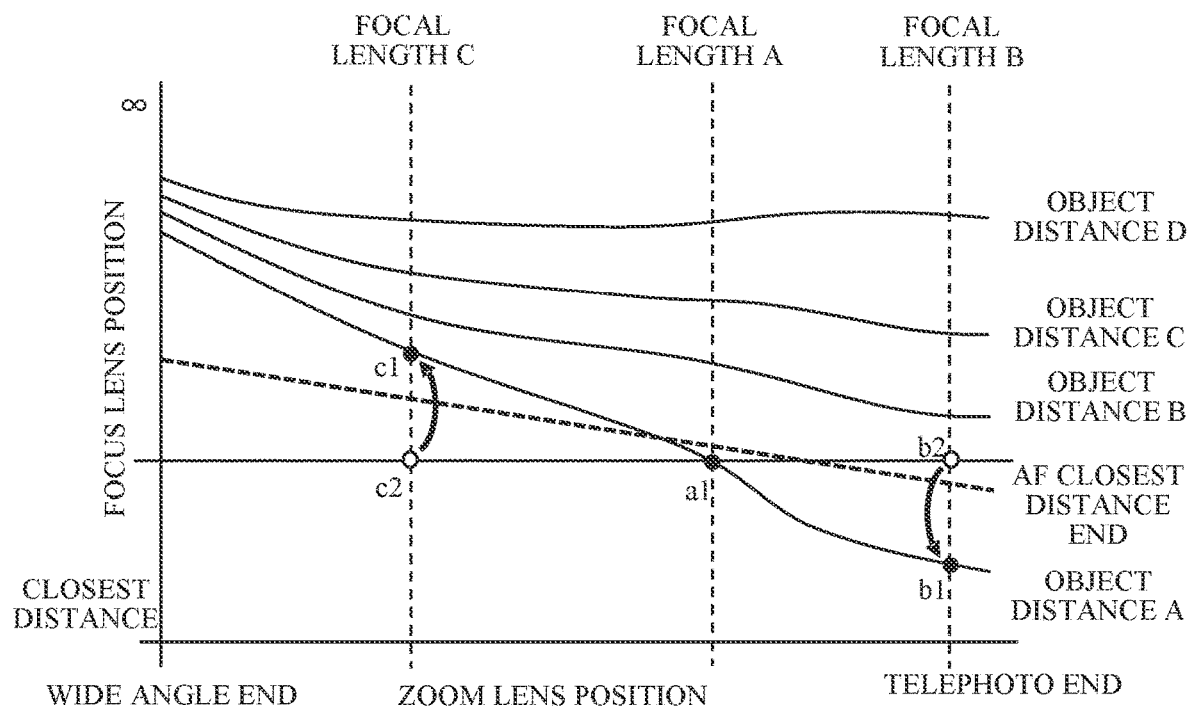
FIG. 19 is an explanatory diagram of the control method according to the fourth embodiment.

Here, referring now to FIG. 19, a description will be given of the control in step S203. FIG. 19 is an explanatory diagram of the control method (step S203) in this embodiment, and shows the focus control to maintain the object distance when the focus lens position in Sleep transition is in the MF exclusive area. In FIG. 19, the ordinate axis denotes the focus lens position, and the abscissa axis denotes the zoom lens position.

When the focus lens position and the zoom lens position are the position a1, the object is in focus at the object distance A. In order to maintain the object distance when the zoom lens position is changed to the focal length B in this state, it is necessary to move the focus lens position to the position b1 by following the electronic cam data trajectory of the object distance A. The lens microcomputer 111 becomes the low power consumption state, in which the internal power supply is turned off, during Sleep and thus cannot move the focus lens 105. Accordingly, if the zoom lens position is moved to the focal length B during Sleep, the focus lens position and the zoom lens position become the position b2 as illustrated in FIG. 19. At this time, the position b1 is in the MF exclusive area, but as described above, since it is assumed that the user has performed the MF operation in Sleep transition, the operability does not deteriorate even with only the MF operation. Thus, the focus lens position is moved from the position b2 to the position b1.

Similarly, if the zoom lens position is changed to the focal length C during Sleep, the focus lens position and the zoom lens position become the position c2 as illustrated in FIG. 19. Moving the focus lens position to the position c1 in Sleep release can maintain the state of focusing on the object at the object distance A. That is, in the step S203 of FIG. 18, the focus lens position is calculated on the basis of the focus lens position in Sleep transition, the current zoom lens position, and the electronic cam data in the object distance A to maintain the object distance in Sleep transition. And, the focus lens 105 is moved to the calculated focus lens position. As a result, even if the zoom lens position is moved during Sleep, the position in the object distance A focused in Sleep transition can be maintained in Sleep release.

On the other hand, in the step S204, the lens microcomputer 111 calculates the focus lens position to maintain the object distance in Sleep transition at the current zoom lens position as in the step S203. Then, the lens microcomputer 111 determines whether or not the calculated focus lens position (focus lens position to maintain the same object) is in the MF exclusive area. If the focus lens position to maintain the same subject is in the MF exclusive area, the processing proceeds to step S205. On the other hand, the focus lens position to maintain the same object is not in the MF exclusive area, the processing proceeds to step S206.

Figure 20:
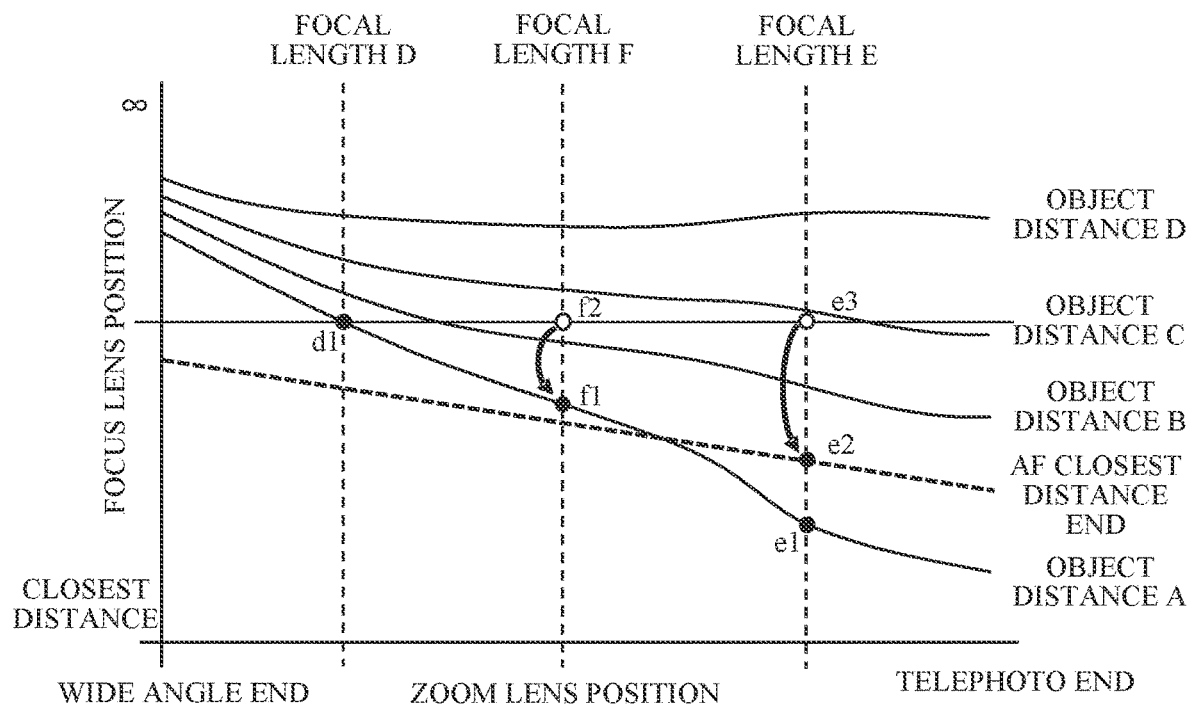
FIG. 20 is an explanatory diagram of the control method according to the fourth embodiment.

Next, referring now to FIG. 20, a description will be given of processing of steps S205 and S206. FIG. 20 is an explanatory diagram of the control method (steps S205 and S206) of this embodiment and shows the focus control to maintain the object distance when the focus lens position in Sleep transition is in the AF available area. In FIG. 20, the ordinate axis denotes the focus lens position, and the abscissa axis denotes the zoom lens position.

When the focus lens position and the zoom lens position are the position d1 in Sleep transition, the object is in focus at the subject distance A. If the zoom lens position changes to the focal length E during Sleep, the focus lens position and the zoom lens position become the position e3 as illustrated in FIG. 20. In order to maintain the object distance in Sleep release, it is necessary to move the focus lens position to the position e1 by following the electronic cam data trajectory of the object distance A. At this time, since the position d1 is in the AF available area, it is assumed that the user has performed focusing by the AF operation in Sleep transition. Since the position e1 in the MF exclusive area, if the focus lens position is moved to the position e1, only the MF operation is performable, and it is assumed that the operation intended by the user (AF operation) cannot be performed. In order to avoid this, in the step S205, the focus lens 105 is moved to the position e2 which is the end of the AF available area, so that the focusing by AF can be performed in Sleep release.

On the other hand, if the zoom lens position is changed to the focal length F during Sleep, the focus lens position and the zoom lens position become the position f2 as illustrated in FIG. 20. In order to maintain the object distance in Sleep release, it is necessary to move the focus lens 105 to the position f1 calculated from the electronic cam data of the object distance A. Since the position f1 is in the AF available area, in the step S206, the focus lens 105 is moved to the position f1 as it is.

As described above, the user operability is improved by avoiding the user from unintentionally moving to the MF exclusive area in Sleep release and maintaining the object distance in Sleep transition as much as possible in Sleep release.

Fifth Embodiment

Next, a description will be given of the fifth embodiment of the present invention. The purpose of this embodiment is to recovery the focus lens position to the AF available area even if the focus lens position is in the MF exclusive area in Sleep transition according to the setting of the camera body 200a.

In this embodiment, when the first position of the focus lens 105 is in the second drive area upon switching from the first power mode to the second power mode, the third controller 111g moves the focus lens according to the command from the imaging apparatus (camera body) 200a. That is, when the first position is in the second drive area in Sleep transition, the third controller 111g moves the focus lens 105 to a third position in the first drive area in Sleep release.

Figure 21:
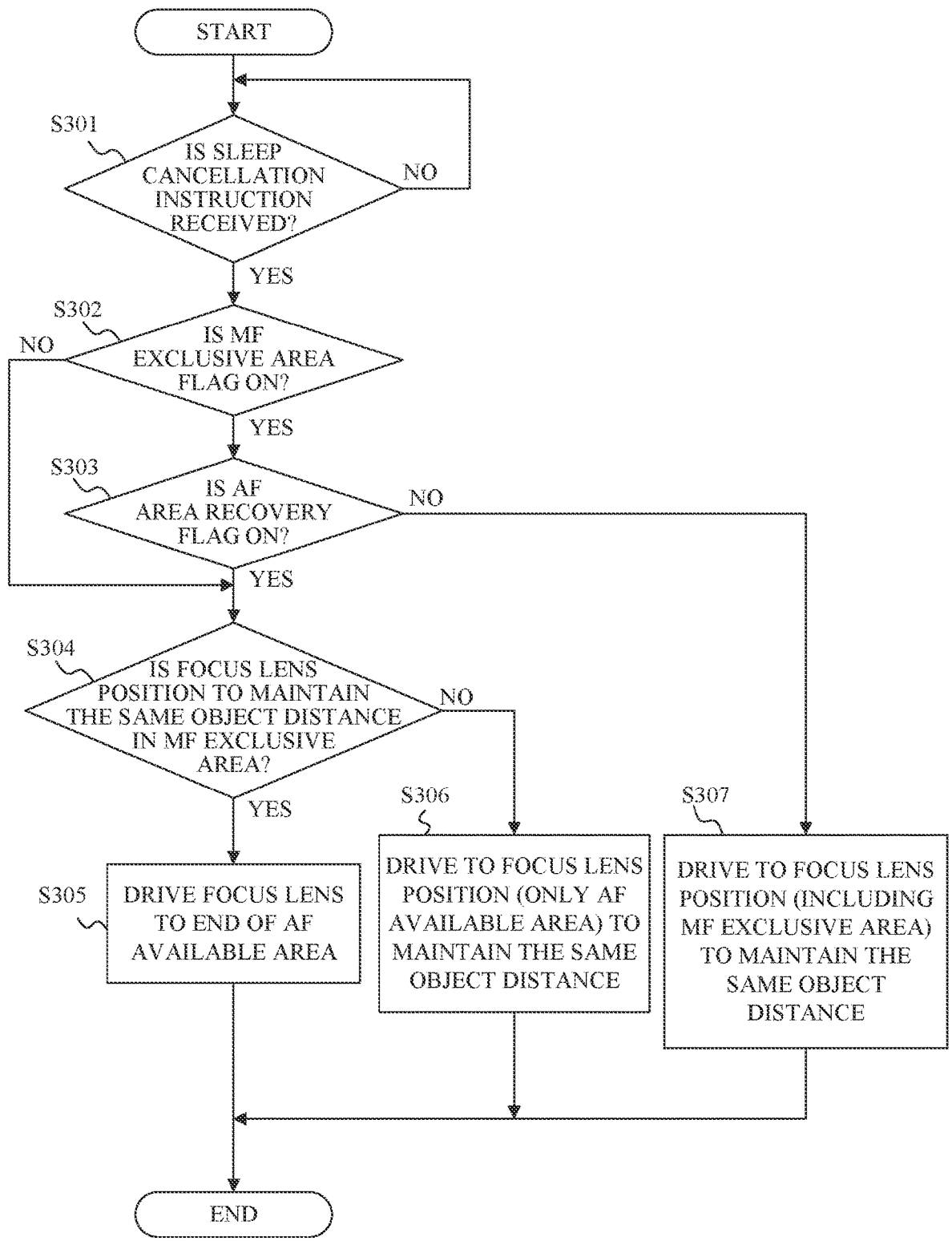
FIG. 21 is a flowchart of a control method at the time of Sleep cancellation according to the fifth embodiment.

Referring now to FIG. 21, a description will be given of the control method of the imaging apparatus 10a in Sleep release. FIG. 21 is a flowchart showing the control method in Sleep release and shows processing in which an interchangeable lens 100a in the Sleep state transits to the Active state by receiving the Sleep cancellation instruction from the camera body 200. The transition process from the Active state to the Sleep state is the same as the processing of the fourth embodiment explained with reference to FIG. 17, and thus the description thereof will be omitted.

First, in step S301, the lens microcomputer 111, which is in the Sleep state and stops the processing, determines whether or not receiving the Sleep cancellation instruction from the camera body 200a. If not receiving the Sleep cancellation instruction from the camera body 200a, the lens microcomputer 111 repeats the determination in the step S301. On the other hand, if receiving the Sleep cancellation instruction from the camera body 200a, the processing proceeds to step S302.

In the step S302, the lens microcomputer 111 determines whether or not the MF exclusive area flag stored in the memory 111e in Sleep transition is ON. If the MF exclusive area flag is ON, the processing proceeds to step S303. On the other hand, if the MF exclusive area flag is OFF, the processing proceeds to step S304.

In the step S303, the lens microcomputer 111 determines whether or not an AF area recovery flag is ON. The ON/OFF of the AF area recovery flag is switched by the lens microcomputer 111 according to the notification from the camera body 200a. The timing when the camera body 200a notifies the switching of the AF area recovery flag of the interchangeable lens 100a is not limited. When the AF area recovery flag is switched while the interchangeable lens 100a is in the Active state, it is necessary to hold the information in the memory 111e capable of holding the information in the Sleep state in Sleep transition.

By functioning the camera body 200a as a trigger to switch the AF area recovery flag, the AF area recovery flag may be switched by setting of the camera body 200a or the operation of the camera body 200a. For example, when Sleep of the interchangeable lens 100a is released by a shutter button of the camera body 200a, it is assumed that the user desires the AF operation. Thus, Setting the AF area recovery flag to ON and recovering the interchangeable lens 100a to absolutely perform the AF can improve user operability.

If the AF area recovery flag is ON in the step S303, the processing proceeds to step S304. On the other hand, if the AF area recovery flag is OFF, the processing proceeds to step S307. In the step S307, similar to the step S203 of the fourth embodiment, the lens microcomputer 111 moves the focus lens 105 to maintain the object distance in sleep transition at the zoom lens position in Sleep release. At this time, the position of the focus lens 105 may be in the MF exclusive area. In the step S304, similar to the step S204 of the fourth embodiment, the lens microcomputer 111 calculates the focus lens position to maintain the object distance in Sleep transition at the current zoom lens position. And the lens microcomputer 111 determines whether or not the calculated focus lens position (focus lens position to maintain same object) is in the MF exclusive area. If the focus lens position to maintain the same object is in the MF exclusive area, the processing proceeds to step S305. On the other hand, the focus lens position to maintain the same object is not in the MF exclusive area, the processing proceeds to step S306. The step S305 is similar to the step S205 of the fourth embodiment, and the lens microcomputer 111 moves the focus lens 105 to the end of the AF area. The step S306 is similar to the step S206 of the fourth embodiment, and the lens microcomputer 111 moves the focus lens 105 to maintain the object distance in Sleep transition at the zoom lens position in Sleep release. At this time, the position of the focus lens 105 is in the AF available area.

As described above, in this embodiment, the camera body 200a determines whether or not the position of the focus lens 105 is always recovered in the AF available area in Sleep release of the interchangeable lens 100a. As a result, it is possible to improve the accuracy of avoiding the user unintentionally moving to the MF exclusive area and to improve user operability.

Sixth Embodiment

Next, a description will be given of the sixth embodiment of the present invention. The purpose of this embodiment is to recovery the focus lens position to the MF exclusive area even if the focus lens position is in the AF available area in Sleep transition while the state of the AF/MF changing switch 112 of the interchangeable lens 100a is the MF.

Figure 22:
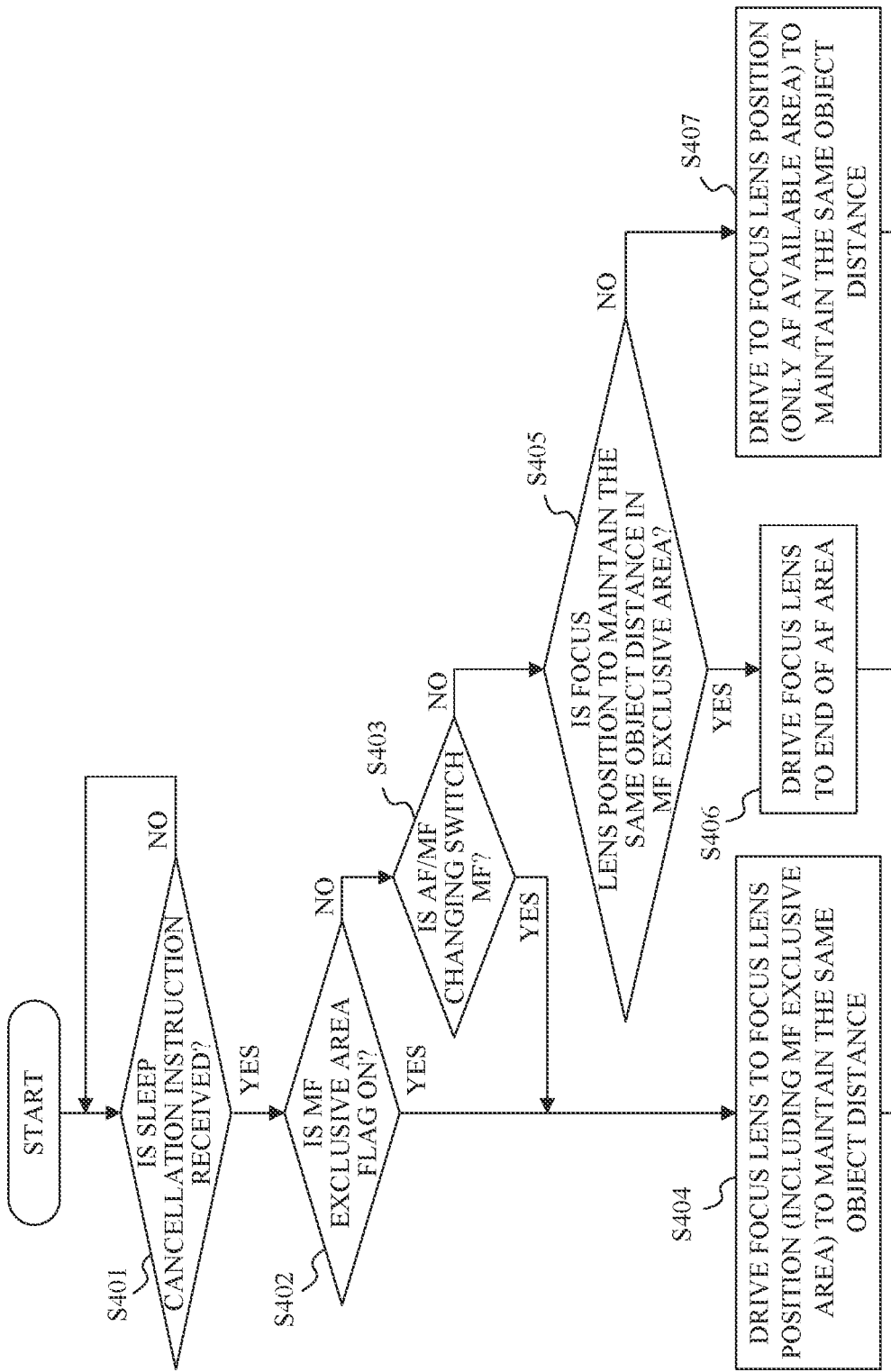
FIG. 22 is a flowchart of a control method at the time of Sleep cancellation according to the sixth embodiment.

Referring now to FIG. 22, a description will be given of the control method in Sleep release of the imaging apparatus 10a. FIG. 22 is a flowchart showing the control method in Sleep release, and shows the processing when the interchangeable lens 100a in the Sleep state transits to the Active state by receiving the Sleep cancellation instruction form the camera body 200a. The transition process from the Active state to the Sleep state is the same as the processing of the fourth embodiment explained with reference to FIG. 17, and thus the description thereof will be omitted.

First, in step S401, the lens microcomputer 111, which is in the Sleep state and stops the processing, determines whether or not receiving the Sleep cancellation instruction from the camera body 200a. If not receiving the Sleep cancellation instruction from the camera body 200a, the lens microcomputer 111 repeats the determination in the step S401. On the other hand, if receiving the Sleep cancellation instruction from the camera body 200a, the processing proceeds to step S402. In the step S402, the lens microcomputer 111 determines whether or not the MF exclusive area flag stored in the memory 111e in Sleep transition is ON. If the MF exclusive area flag is ON, the processing proceeds to step S404. On the other hand, if the MF exclusive area flag is OFF, the processing proceeds to step S403.

In the step S403, the lens microcomputer 111 determines whether or not the state of the AF/MF changing switch 112 of the interchangeable lens 100a is the MF (MF state). If the state of the AF/MF changing switch 112 is the MF, the processing proceeds to the step S404. On the other hand, if the state of the AF/MF changing switch 112 is the AF, the processing proceeds to step S405. In this embodiment, the AF/MF changing switch 112 is provided in the interchangeable lens 100a, but it is not limited to this, and the AF/MF changing switch may be provided in the camera body 200a.

In the step S404, similar to the step S203 of the fourth embodiment, the lens microcomputer 111 moves the focus lens 105 to maintain the object distance in Sleep transition at the zoom lens position in Sleep release. At this time, since the state of AF/MF changing switch 112 is the MF, it is assumed that the user desires the MF operation. Thus, the position of the focus lens 105 may be in the MF exclusive area.

In the step S405, the lens microcomputer 111 calculates the focus lens position to maintain the object distance in Sleep transition at the current zoom lens position as similar to the step S204. And the lens microcomputer 111 determines whether or not the calculated focus lens position (focus lens position to maintain the same object) is in the MF exclusive area. If the focus lens position to the same object is in the MF exclusive area, the processing proceeds to step S406. On the other hand, if the focus lens position to maintain the same object is not in the MF exclusive area, the processing proceeds to step S407.

The step S406 is similar to the step S205 of the fourth embodiment, and the lens microcomputer 111 moves the focus lens 105 to the end of the AF area. The step S407 is similar to the step S206 of the fourth embodiment, and the lens microcomputer 111 moves the focus lens 105 to maintain the object distance in Sleep transition at the zoom lens position in Sleep release. The steps S406 and S407 are processing executed when the state of the AF/MF changing switch 112 is the AF, and the lens microcomputer 111 always moves the position of the focus lens 105 to the AF available area.

As described above, in this embodiment, it is determined whether or not to recovery the focus lens position to the MF exclusive area on the basis of the state of the AF/MF changing switch 112. As a result, it is possible to improve the accuracy of avoiding the user from unintentionally moving to the MF exclusive area and to improve user operability.

According to the fourth to sixth embodiments, the control apparatus that prevents switching from the AF available area to the MF exclusive area unintended by the user in Sleep release to improve user operability, a lens apparatus, an imaging apparatus, a control method, and a non-transitory computer-readable storage can be provided.

For example, when the interchangeable lens 100a is attached to the camera body 200a or the battery is inserted while the interchangeable lens 100a is attached to the camera body 200a, the third controller 111g may move the focus lens 105 to a fourth position in the first drive area. Further, this control may be executed when there is no information stored in the memory 111e in switching from the first power mode to the second power mode.

Next, referring now to figures, a description will be given of seventh and eighth embodiments. The configurations assigned in the first to third embodiments are explained in the first to third embodiments, and thus the description thereof will be omitted.

Figure 23:
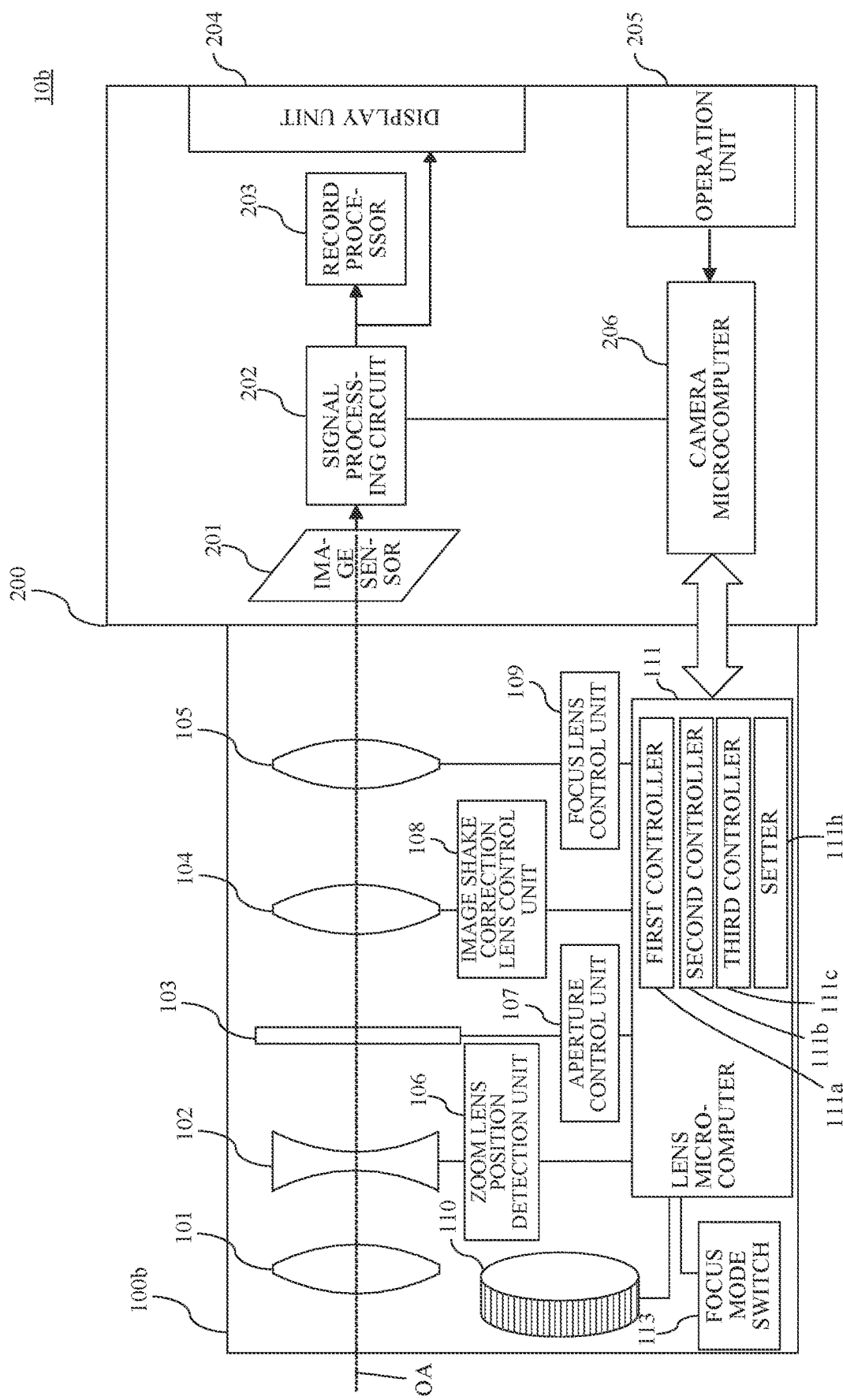
FIG. 23 is a block diagram of an imaging apparatus according to seventh and eighth embodiments.

First, a description will be given of a configuration of an imaging apparatus according to the seventh and eighth embodiments. FIG. 23 is a block diagram of an imaging apparatus 10b. The imaging apparatus 10b includes the camera body (imaging apparatus body) 200 and an interchangeable lens (lens apparatus) 100b that can be attached to and detached from the camera body 200. However, the imaging apparatus according to the seventh and eighth embodiments is not limited to this, and the camera body and the lens apparatus may be integrally configured.

The interchangeable lens 100b is mechanically and electrically connected to the camera body 200 through a mount (not illustrated). The interchangeable lens 100b receives power from the camera body 200 through a power supply terminal (not illustrated) provided on the mount described above. The interchangeable lens 100b controls various actuators and the lens microcomputer 111, which will be described later, by using the power received from the camera body 200. The camera body 200 performs communication with the interchangeable lens 100b through a communication terminal (not illustrated) provided on the mount described above and sends a control command to the interchangeable lens 100b to control the interchangeable lens 100b.

The interchangeable lens 100b includes an image pickup optical system, control units that respectively control each actuator driving the image pickup optical system, the operation ring 110 to operate the focus lens 105, a focus mode switch 113, and the lens microcomputer 111.

The lens microcomputer 111 has also a function to send a focus mode selected by the user through the focus mode switch 113 to the camera body 200.

In the seventh and eighth embodiments, the lens microcomputer 111 has the first controller 111a, the second controller 111b, the third controller 111c, and a setter 111h. The first controller 111a automatically adjusts the focus lens 105 to a focusing position (that is, the first controller 111a has the function of realizing AF control). The second controller 111b manually adjusts the focus lens 105 (on the basis of the user operation quantity) (that is, the second controller 111b has the function of realizing MF control). The third controller 111c drives the focus lens 105 (zoom tracking control, etc.). The setter 111d acquires a signal from the focus mode switch 113 and switchably sets switcher 111d first control (AF control) by the first controller 111a and second control (MF control) by the second controller 111b.

As described above, the first controller 111a and the second controller 111b effectively work in the first drive area (AF available area) of the focus lens 105, and the first controller 111a is disabled in the second drive area (MF exclusive area) of the focus lens 105. When the setter 111d sets the second control, the third controller 111c performs the control as follows. That is, when the second drive area changes so that the position of the focus lens is included in the second drive area to maintain the object distance while the focus lens is positioned the third controller 111c drives the focus lens to maintain the object distance. Additionally, when the second area changes so that the position of the focus lens is included in the first drive area to maintain the object distance while the focus lens is in the second drive area, the third controller 111c drives the focus lens to maintain the object distance. In the seventh and eighth embodiments, the third controller 111c drives the focus lens 105 on the basis of increase/decrease changes in ratio of the second drive area to the entire drive area.

The imaging apparatus 10b of the seventh and eighth embodiments can perform focusing by driving the focus lens 105 using the autofocus (AF) that automatically performs focusing and the manual focus (MF) that manually performs focusing. The camera microcomputer 206 acquires the setting state of the focus mode, which is selected by the user through the focus mode switch 113, via the camera communication unit and determines whether the user sets the focus mode to the AF mode or the MF mode. When the AF mode is selected, the camera microcomputer 206 sends the control command regarding focusing to the lens microcomputer 111. On the other hand, when the MF mode is selected, the camera microcomputer 206 does not send the control command regarding focusing and gives priority to the operation of the operation ring 110.

The AF available area illustrated in FIG. 3 is an area where focusing can be performed in both the AF and the MF. Thus, the object B existing in the AF available area can be focused in both the AF and the MF. On the other hand, since the AF evaluation value cannot be calculated accurately, the MF exclusive area illustrated in FIG. 3 is an area in which focusing by the AF cannot be performed and the focusing by the MF can be performed. Thus, the object A existing in the MF exclusive area can be focused only in the MF. At this time, even if the user selects the AF mode using the focus mode switch 113, the MF mode is set because it is an area where focusing cannot be performed by the AF.

Hereinafter in the seventh and eighth embodiments, a description will be given of a control method of the imaging apparatus 10b.

Seventh Embodiment

First, a description will be given of the seventh embodiment of the present invention. The relation between the zoom lens position and the shortest image taking distance is the same as the first embodiment described using FIG. 4.

Figure 24:
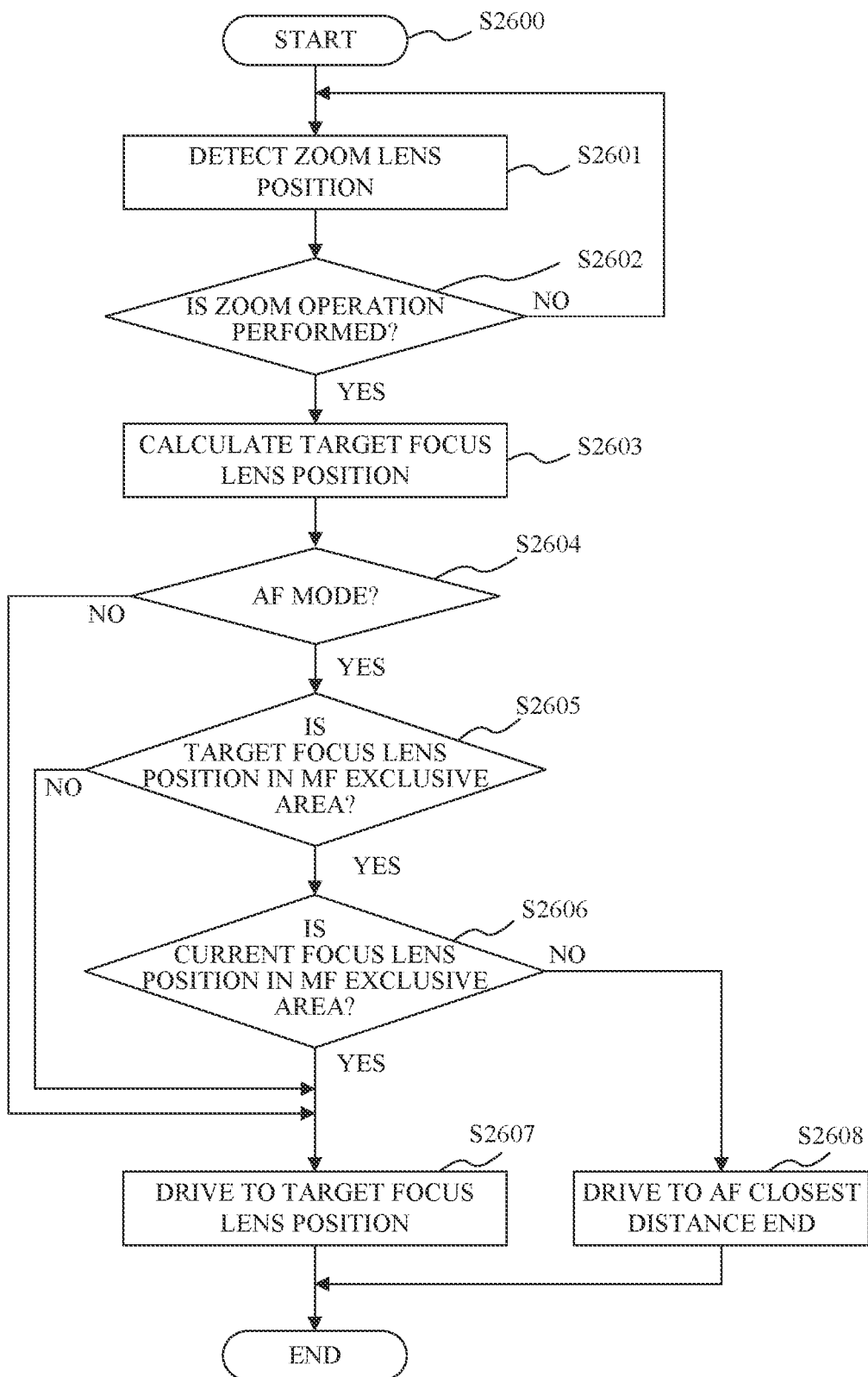
FIG. 24 is a flowchart of a control method according to the seventh embodiment.

Next, referring now to FIG. 24, a description will be given of a flow of the focus lens control (control method) when switching between the AF available area (first drive area) and the MF exclusive area (second drive area) by the zooming tracking processing according to this embodiment. FIG. 24 is a flowchart of the control method according to this embodiment.

First, in step S2600, the lens microcomputer 111 starts the processing. In step S2601, the lens microcomputer 111 acquires the position data of the zoom lens 102 (zoom lens position) using the signal detected by the position detection sensor of the zoom lens position detection unit 106. In step S2602, the lens microcomputer 111 determines whether or not the zoom operation is performed by comparing the previously acquired zoom lens position and the zoom lens position detected in the step S2601. If the zoom operation is performed in the step S2602, the processing proceeds to step S2603. On the other hand, if the zoom operation is not performed, the processing returns to the step S2601.

In the step S2603, the lens microcomputer 111 calculates the target focus lens position to maintain the object distance at the current zoom lens position on the basis of the electronic cam data (tracking curve) showing the relation between the zoom lens position and the focus lens position. The electronic cam data is stored in the memory of the lens microcomputer 111, for example.

Figure 25:
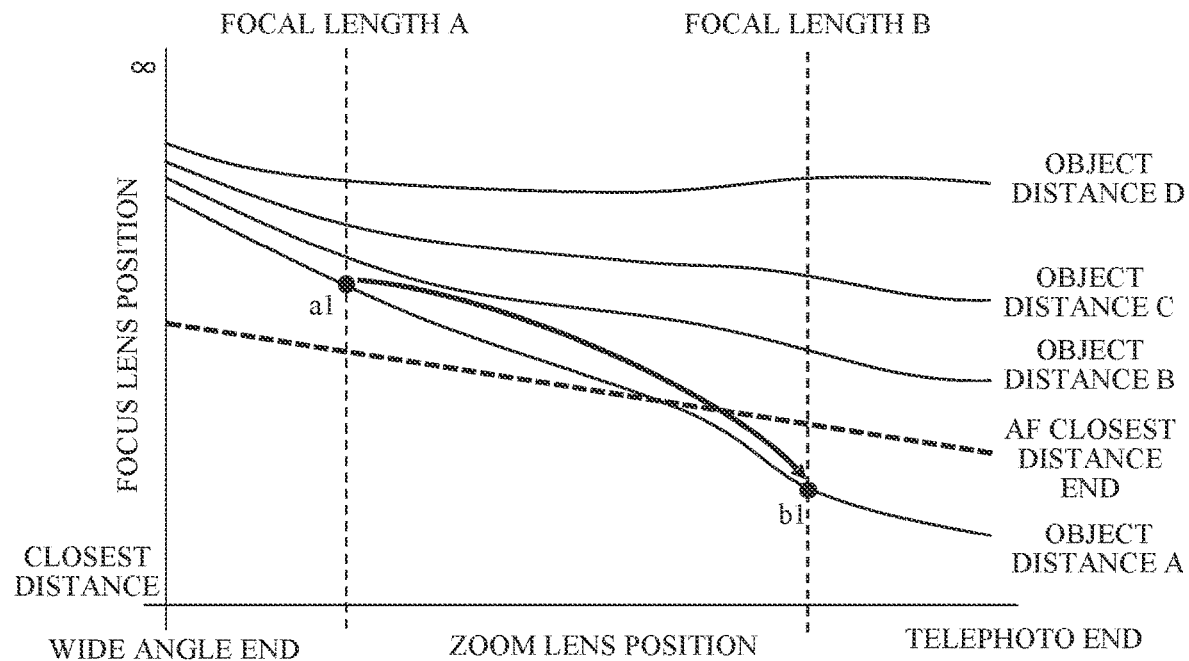
FIG. 25 is an explanatory diagram of the control method according to the seventh embodiment.

Here, referring now to FIG. 25, a description will be given of the target focus lens position to maintain the object distance. FIG. 25 is an explanatory diagram of the control method according to this embodiment and shows the focus control to maintain the object distance when the focus mode is the MF mode in processing the zoom tracking processing. In FIG. 25, the ordinate axis denotes the focus lens position, and the abscissa axis denotes the zoom lens position. As illustrated in FIG. 25, it is assumed that the current focus lens position a1 is on the electronic cam at the object distance A. At this time, when the zoom lens position moves from the focal length A to the focal length B by performing the zoom operation, the target focus lens position to maintain the object distance A becomes b1.

In step S2604 of FIG. 24, the lens microcomputer 111 determines whether or not the AF mode is selected by the focus mode switch 113. If the MF mode is selected in the step S2604, the processing proceeds to step S2607. In the step S2607, the lens microcomputer 111 outputs the control command to the focus lens control unit 109 to drive the focus lens 105 to the target focus position. As illustrated in FIG. 25, the lens microcomputer 111 drives the focus lens 105 so that the current focus lens position a1 moves to the target focus position b1 to maintain the object distance.

If the AF mode is selected in the step S2604, the processing proceeds to step S2605. In the step S2605, the lens microcomputer 111 determines whether or not the target focus lens position calculated in the step S2603 is in the MF exclusive area at the current zoom lens position. The memory of the lens microcomputer 111 stores the closest distance end data (AF closest distance end) of the AF available area at each zoom lens position. Thus, the lens microcomputer 111 can determine whether the target focus lens position is in the AF available area or the MF exclusive area depending on whether the target focus lens position is closer to the closest distance side or the infinite side than the AF closest distance end.

Figure 26:
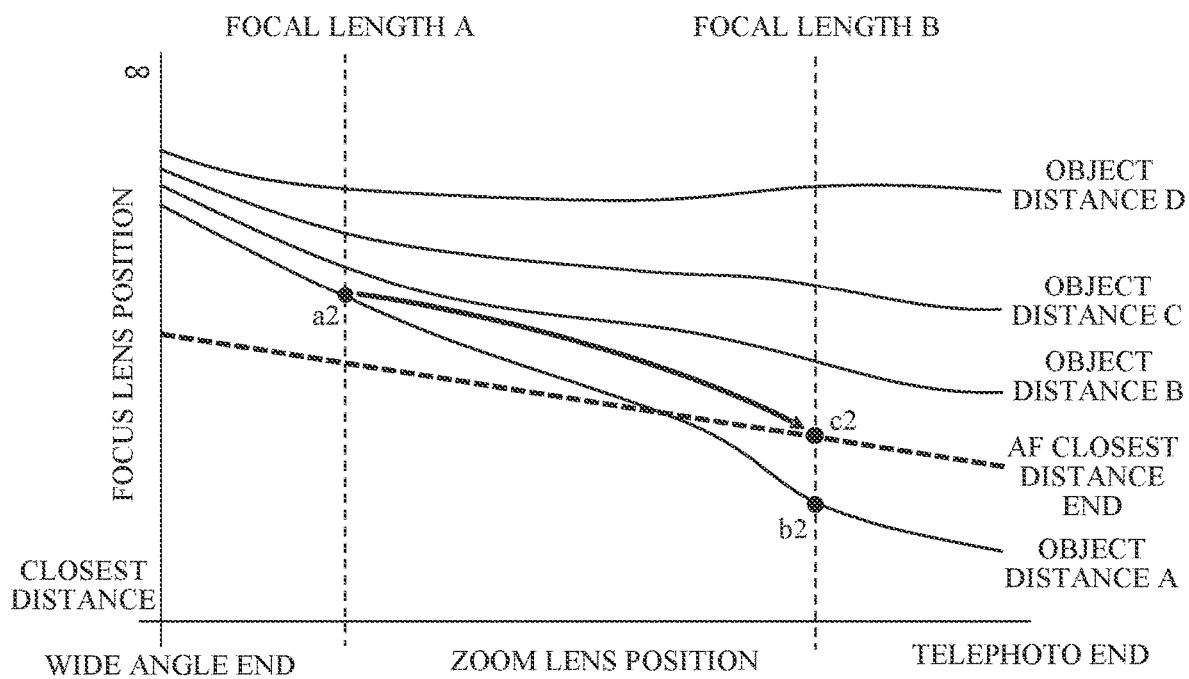
FIG. 26 is an explanatory diagram of the control method according to the seventh embodiment.

FIG. 26 is an explanatory diagram of the control method according to this embodiment and shows the focus control to maintain the AF available area when the focus lens position before the zoom tracking processing is in the AF available area. In FIG. 26, the ordinate axis denotes the focus lens position, and the abscissa axis denotes the zoom lens position. As illustrated in FIG. 26, it is assumed that the target focus lens position b2 is closer to the closest distance side than the AF closest distance end. Thus, the target focus lens position b2 is determined to be in the MF exclusive area.

In step S2606, the lens microcomputer 111 determines whether the current focus lens position is in the AF available area or the MF exclusive area depending on whether the current focus lens position is closer to the closest distance side or the infinite side than the AF closest distance end. In the step S2606, if it is determined that the current focus lens position is in the AF available area, the processing proceeds to step S2608. In the step S2608, the lens microcomputer 111 (third controller 111c) outputs the control command to the focus lens control unit 109 to drive the focus lens 105 to the AF closest distance end. As illustrated in FIG. 26, the current focus lens position a2 is closer to the infinite side than the AF closest distance end. Thus, the lens microcomputer 111 determines that the current focus lens position a2 is in the AF available area and drives the focus lens 105 to the AF closest distance end c1 to maintain the AF available area. That is, when the MF exclusive area changes so that the position of the focus lens is included in the MF exclusive area to maintain the object distance while the focus lens is positioned in the AF available area, the third controller 111c drives the focus lens so that the focus lens is positioned in the AF available area.

If it is determined in the step S2605 that the target focus lens position is in the AF available area, the processing proceeds to the step S2607. In the step S2607, the lens microcomputer 111 (third controller 111c) outputs the control command to the focus lens control unit 109 to drive the focus lens 105 to the target focus position. That is, when the MF exclusive area changes so that the position of the focus lens is included in the AF available area to maintain the object distance while the focus lens is positioned in the AF available area, the third controller 111c drives the focus lens to maintain the object distance. Further, when the MF exclusive area changes so that the position of the focus lens is included in the AF available area to maintain the object distance while the focus lens is positioned in the MF exclusive area, the third controller 111c drives the focus lens to maintain the object distance.

Figure 27:
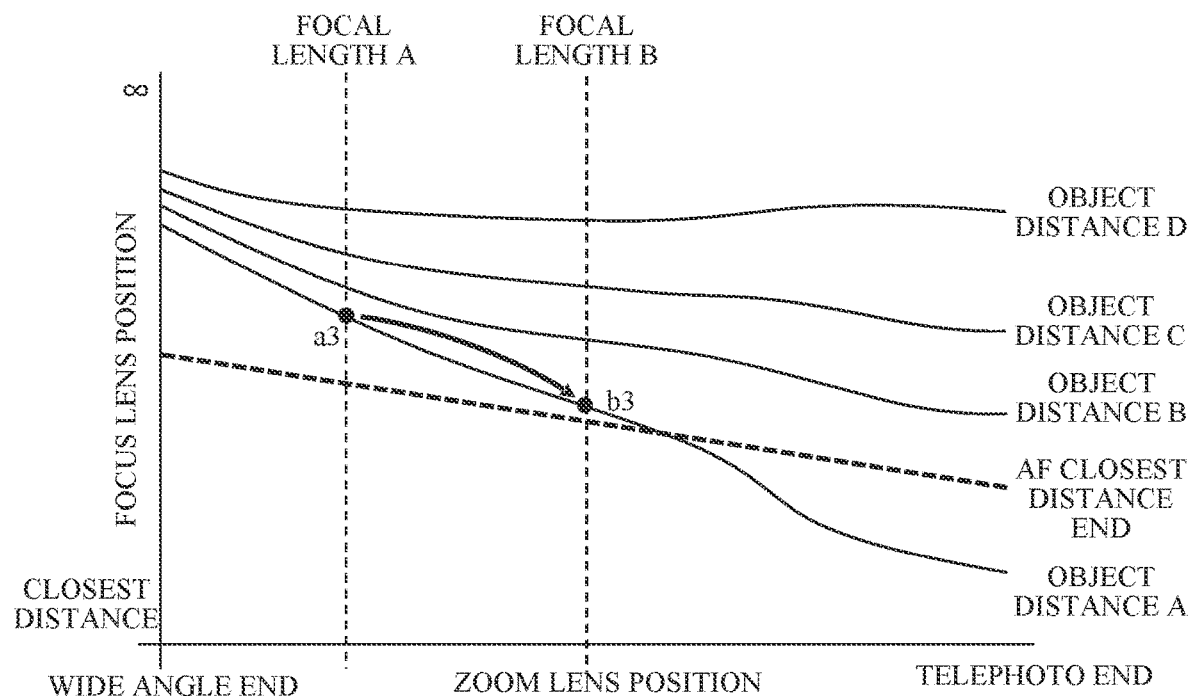
FIG. 27 is an explanatory diagram of the control method according to the seventh embodiment.

FIG. 27 is an explanatory diagram of the control method according to this embodiment and shows the focus control to maintain the object distance when the focus lens position before the zoom tracking processing is in the AF available area. In FIG. 27, the ordinate axis denotes the focus lens position, and the abscissa axis denotes the zoom lens position. As illustrated in FIG. 27, the target focus lens position b3 is closer to the infinite side than the AF closest distance end. Thus, the lens microcomputer 111 determines that the target focus lens position b3 is in the AF available area and drives the focus lens 105 to the target focus position b3 to maintain the object distance.

If it is determined in the step S2606 that the current focus lens position is in the MF exclusive area, the processing proceeds to the step S2607. In the step S2607, the lens microcomputer 111 outputs the control command to the focus lens control unit 109 to drive the focus lens 105 to the target focus position.

Figure 28:
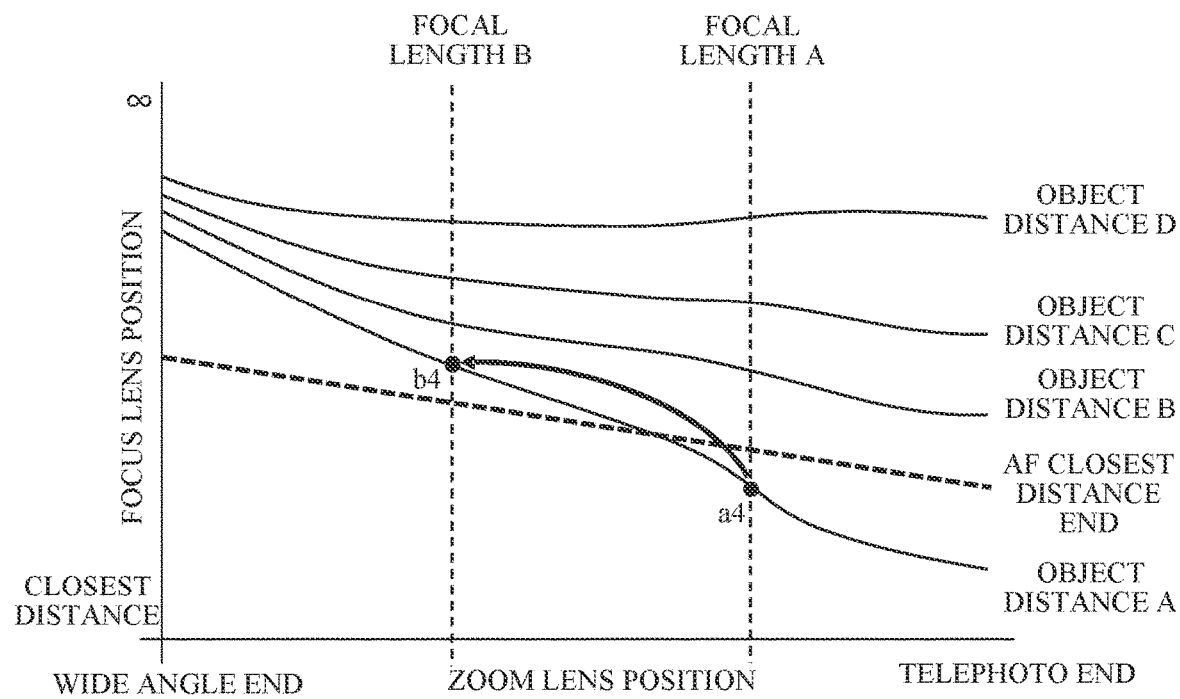
FIG. 28 is an explanatory diagram of the control method according to the seventh embodiment.

FIG. 28 is an explanatory diagram of the control method according to this embodiment and shows the focus control to maintain the object distance when the focus lens position before the zoom tracking processing is in the MF exclusive area. In FIG. 28, the ordinate axis denotes the focus lens position, and the abscissa axis denotes the zoom lens position. As illustrated in FIG. 28, the current focus lens position a4 is closer to the closest distance side than the AF closest distance end. Thus, the lens microcomputer 111 determines that the current focus lens position a4 is in the MF exclusive area and drives the focus lens 105 to the target focus position b4 to maintain the object distance.

In this embodiment, the MF exclusive area changes according to the position of the zoom lens. In this embodiment, when the position of the zoom lens is at the wide angle end (WIDE), the MF exclusive area has the first size, and when the position of the zoom lens is at the telephoto end (TELE), the MF exclusive area has the second size smaller than the first size. However, this embodiment is not limited to this, and the relation between the position of the zoom lens (wide angle end and telephoto end) and the size of the MF exclusive area (first size and second size) may be reversed.

As described above, in this embodiment, when the MF mode is selected by the user, the focus lens 105 is driven to the target focus lens position to maintain the object distance irrespective of the area of the focus lens position before and after performing the zoom tracking processing. As a result, the focusing state of the object can be maintained.

On the other hand, when the AF mode is selected by the user, the control of the focus lens 105 is switched according to the area of the focus lens position before and after performing the zoom tracking processing. When the focus lens position before the zoom tracking processing is in the AF available area and the target focus lens position to maintain the object distance by the zoom tracking processing is in the MF exclusive area, control is performed as follows. That is, it is prohibited that the focus lens 105 moves from the AF available area to the MF exclusive area by an operation other than the user's MF operation. Thereby, the focus lens 105 is prevented from unintentionally moving from the AF available area to the MF exclusive area. Additionally, when the focus lens position before the zoom tracking processing is in the MF exclusive area, driving the focus lens 105 to the target focus lens position to maintain the object distance can maintain the focusing state of the object. In this way, the user operability can be improved by switching the control of the focus lens 105 according to the setting of the focus mode of the user and the area of the focus lens position before and after performing the zoom tracking processing.

Eighth Embodiment

Next, a description will be given of the eighth embodiment of the present invention. In the interchangeable lens 100b according to this embodiment, when the luminous flux reaching the phase difference AF sensor of the image sensor 201 becomes smaller due to the aperture unit 103 that limits the light quantity of the object image, the accuracy of the AF evaluation value decreases and there is the area (AF disable area) where high-precision AF cannot be realized. In this embodiment, the area where high-precision AF cannot be realized due to the influence of the aperture unit 103 is defined as the MF exclusive area.

The relation between the aperture value (F value) and the shortest image taking distance is same as the third embodiment described using FIG. 11.

Figure 29:
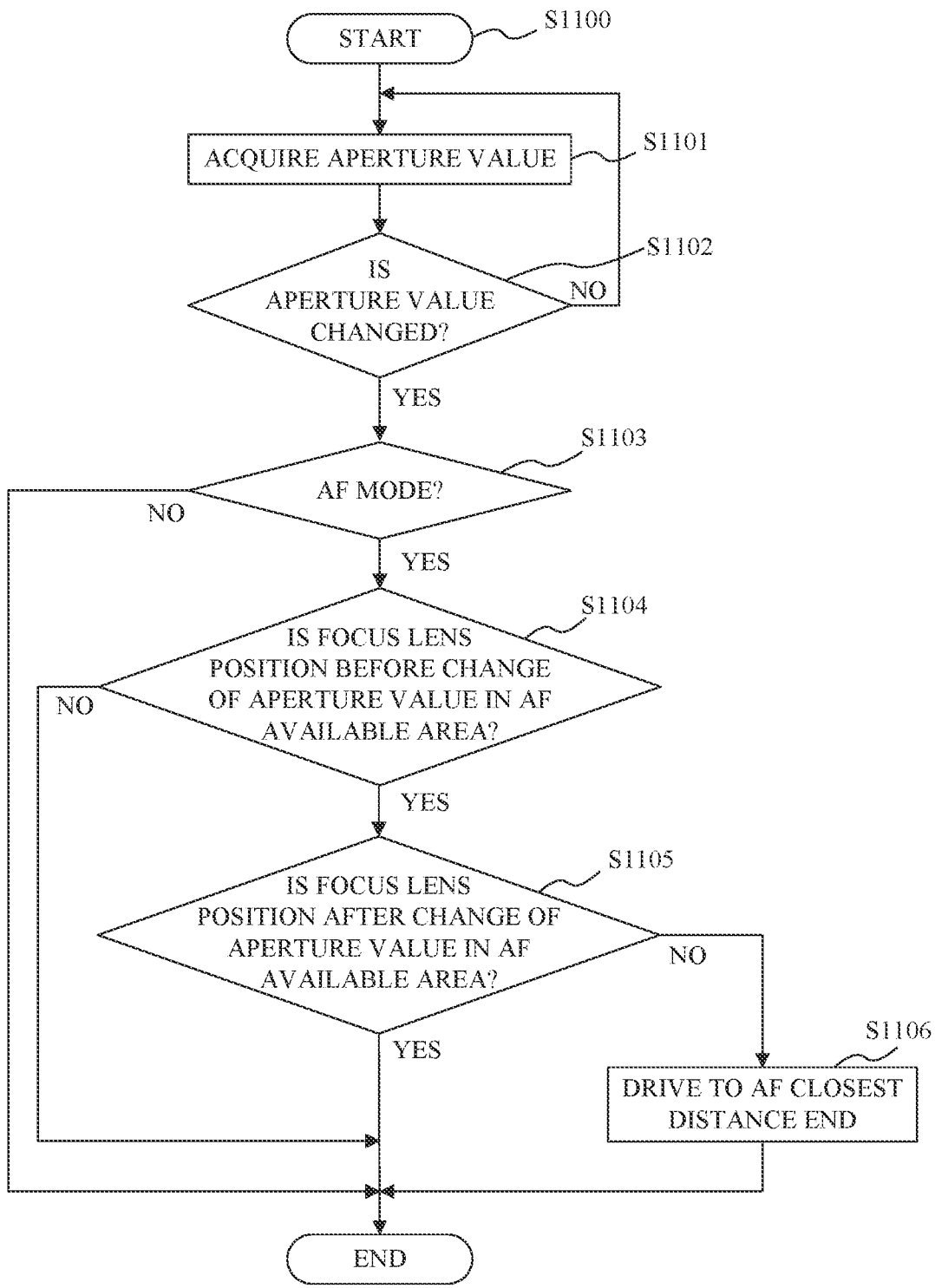
FIG. 29 is a flowchart of a control method according to the eighth embodiment.

Next, referring now to FIG. 29, a description will be given of the flow of the focus lens control (control method) according to this embodiment when switching between the AF available area and the MF exclusive area due to changes in the aperture value. FIG. 29 is a flowchart of the control method according to this embodiment.

First, in step S1100, the lens microcomputer 111 starts processing. Next, in step S1101, the lens microcomputer 111 acquires the aperture value set according to the control command transmitted from the camera body 200. Subsequently, in step S1102, the lens microcomputer 111 determines whether or not the aperture value is changed by comparing the previously acquired aperture value with the aperture value acquired in the step S1201. If it is determined in the step S1102 that the aperture value is changed, the processing proceeds to step S1103. On the other hand, if it is determined that the aperture value is not changed, the processing returns to the step S1101 and the lens microcomputer 111 acquires the aperture value.

If it is determined in the step S1102 that the aperture value is changed, the lens microcomputer 111 determines whether or not the focus mode switch 113 selects the AF mode in the step S1103. If the MF mode is selected in the step S1103, the lens microcomputer 111 does not drive the focus lens 105.

Figure 30:
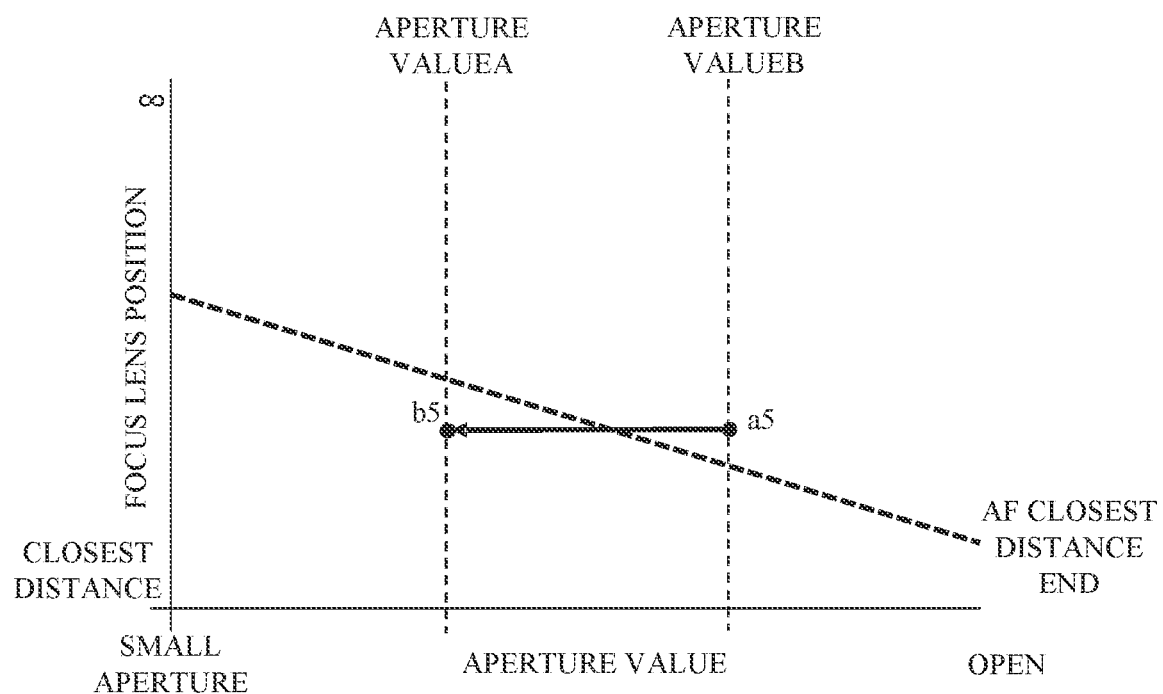
FIG. 30 is an explanatory diagram of the control method according to the eighth embodiment.

FIG. 30 is an explanatory diagram of the control method according to this embodiment and shows the focus control to maintain the object distance when the focus mode is the MF mode in changing the aperture value. In FIG. 30, the ordinate axis denotes the focus lens position, and the abscissa axis denotes the aperture value. As illustrated in FIG. 30, the object distance is maintained without driving the focus lens 105 before the change of the aperture value (aperture value A) and after the change of the aperture value (aperture value B).

In step S1104, the lens microcomputer 111 determines whether or not the focus lens position before the change of the aperture value is in the AF available area. The lens microcomputer 111 holds the closest distance end data (AF closest distance end) of the AF available area in the memory at each aperture value. The lens microcomputer 111 determines whether the focus lens position before the change of the aperture value is in the AF available area or the MF exclusive area depending on whether the focus lens position before the change of the aperture value is closer to the closest distance side or the infinite side than the AF closest distance end.

Figure 31:
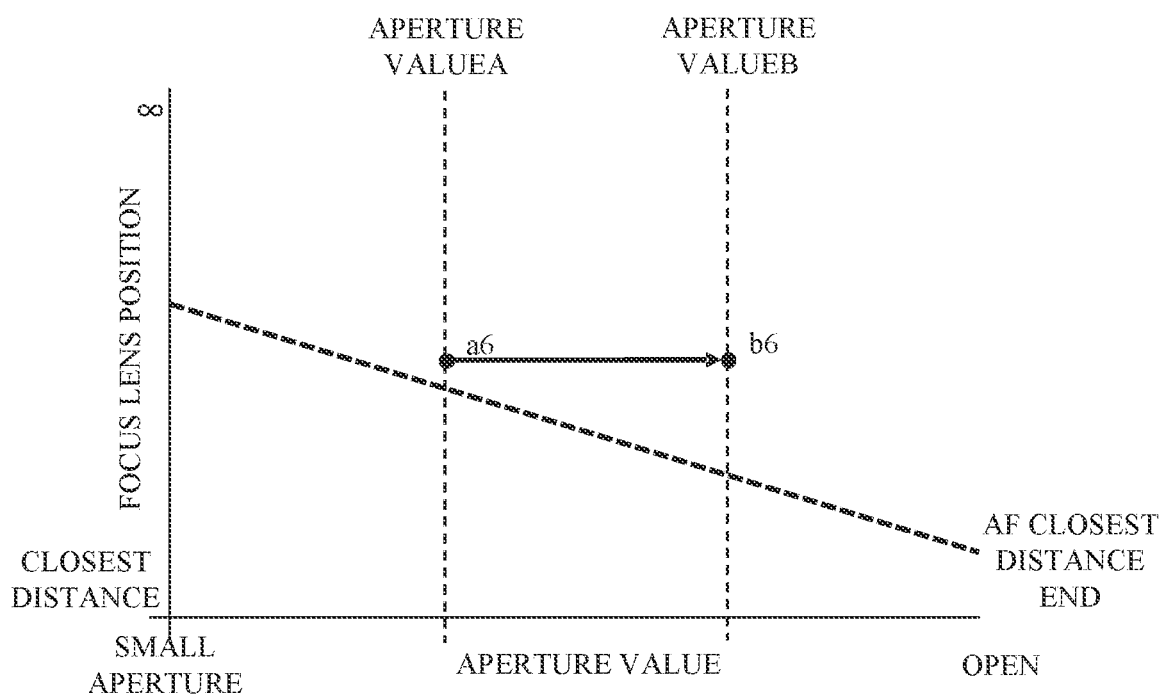
FIG. 31 is an explanatory diagram of the control method according to the eighth embodiment.

FIG. 31 is an explanatory diagram of the control method according to this embodiment and shows the focus control to maintain the object distance when the focus lens position before the change of the aperture value is in the AF available area. In FIG. 31, the ordinate axis denotes the focus lens position, and the abscissa axis denotes the aperture value. As illustrated in FIG. 31, when the aperture value is changed from the aperture value A to the aperture value B, the focus lens position a6 before the change of the aperture value (aperture value A) is closer to the infinite side than the AF closest distance end. Thus, the lens microcomputer 111 determines that the focus lens position a6 before the change of the aperture value is in the AF available area.

If it is determined in the step S1104 that the focus lens position before the change of the aperture value is in the AF available area, the processing proceeds to step S1105. In the step S1105, the lens microcomputer 111 determines whether or not the focus lens position after the change of the aperture value is in the AF available area. The lens microcomputer 111 determines whether the focus lens position after the change of the aperture value is in the AF available area or the MF exclusive area depending on whether the focus lens position after the change of the aperture value is closer to the closest distance side or the infinite side than the AF closest distance end. As illustrated in FIG. 31, the focus lens position b6 after the change of the aperture value (aperture value B) is closer to the infinite side than the AF closest distance end. This, the lens microcomputer 111 determines that the focus lens position b6 after the change of the aperture value is in the AF available area and maintains the object distance without driving the focus lens 105.

If it is determined in the step S1104 that the focus lens position before the change of the aperture value is in the MF exclusive area, the lens microcomputer 111 does not drive the focus lens 105.

Figure 32:
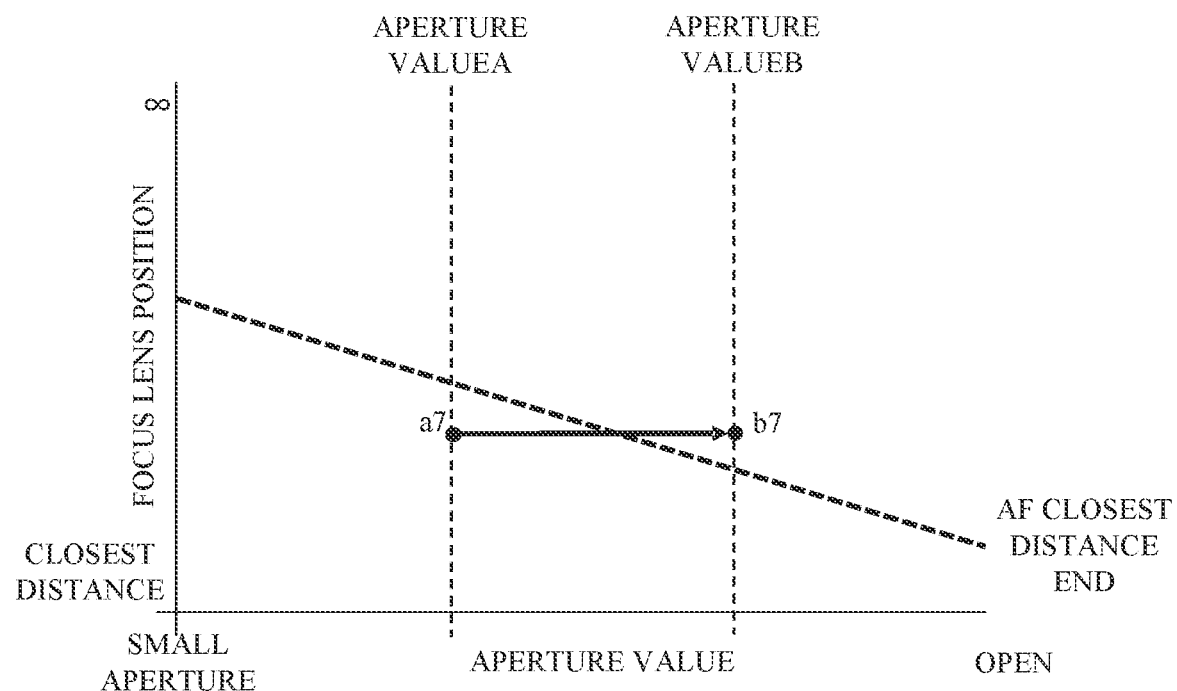
FIG. 32 is an explanatory diagram of the control method according to the eighth embodiment.

FIG. 32 is an explanatory diagram of the control method according to this embodiment and shows the focus control to maintain the object distance when the focus lens position before the change of the aperture value is in the MF exclusive area. In FIG. 32, the ordinate axis denotes the focus lens position, and the abscissa axis denotes the aperture value. As illustrated in FIG. 32, the focus lens position a7 before the change of the aperture value is closer to the closest distance side than the AF closest distance side. Thus, the lens microcomputer 111 determines that the focus lens position a7 before the change of the aperture value is in the MF exclusive area and maintains the object distance without driving the focus lens 105.

If it is determined in the step S1105 that the focus lens position before the change of the aperture value is in the MF exclusive area, the processing proceeds to step S1106. In the step S1106, the lens microcomputer 111 outputs the control command to the focus lens control unit 109 to drive the focus lens 105 to the AF closest distance end.

Figure 33:
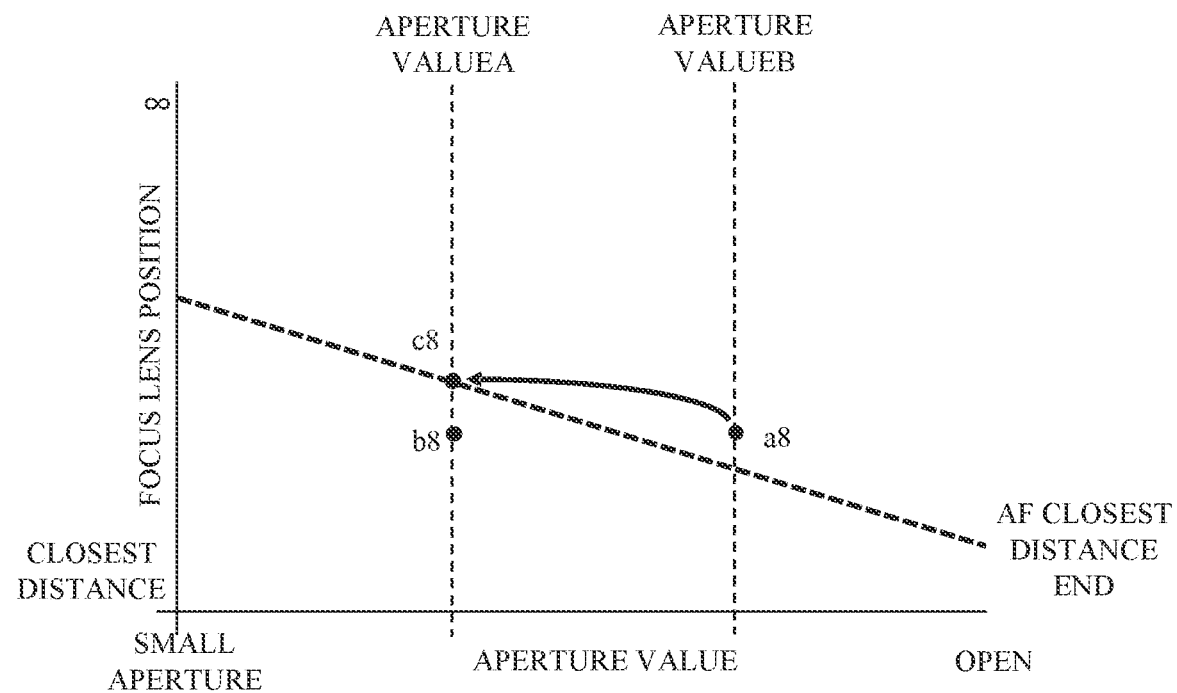
FIG. 33 is an explanatory diagram of the control method according to the eighth embodiment.

FIG. 33 is an explanatory diagram of the control method according to this embodiment and shows the focus control to maintain the AF available area when the focus lens position before the change of the aperture value is in the AF available area. In FIG. 33, the ordinate axis denotes the focus lens position, and the abscissa axis denotes the aperture value. As illustrated in FIG. 33, the focus lens position a8 after the change of the aperture value is closer to the closest distance side than the AF closest distance side. Thus, the lens microcomputer 111 determines that the focus lens position a8 after the change of the aperture value is in the MF exclusive area and drives the focus lens 105 to the AF closest distance end c8 to maintain the AF available area.

As described above, in this embodiment, when the MF mode is selected by the user, the position of the focus lens 105 is maintained and the focusing state of the object is maintained regardless of the area of the focus lens position before and after the change of the aperture value. On the other hand, when the AF mode is selected by the user, the control of the focus lens 105 is switched according to the area of the focus lens position before and after the change of the aperture value. If the focus lens position before the change of the aperture value, which is in the AF available area, is switched to the MF exclusive area by changing the aperture value, the focus lens 105 is driven to the AF available area not to switch from the AF available area to the MF exclusive area except by the user's MF operation. This can prevent the user from unintentionally changing from the AF available area to the MF exclusive area. On the other hand, when the focus lens position before the change of the aperture value is in the MF exclusive area, the focusing state of the object is maintained by maintaining the position of the focus lens 105. In this way, the user operability can be improved by switching the control of the focus lens 105 according to the setting of the focus mode of the user and the area of the focus lens position before and after the change of the aperture value.

According to the seventh and eighth embodiments, the control apparatus that reflects the user's intention and prevents switching from the AF available area to the MF exclusive area by other than MF operation to improve user operability, a lens apparatus, an imaging apparatus, a control method, and a non-transitory computer-readable storage can be provided.

In the seventh and eighth embodiments, the lens microcomputer 111 performs functions as the first controller 111a, the second controller 111b, the third controller 111c, and the setter 111h, but is not limited thereto. For example, the camera microcomputer 206 as the control apparatus may be configured to perform at least one function of the first controller, the second controller, the third controller, or the setter.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-014226, filed on Jan. 30, 2020, No. 2020-014227, filed on Jan. 30, 2020 and No. 2020-014228, filed on Jan. 30, 2020 each of which is hereby incorporated by reference herein in its entirety.

What is claimed is:

1. A control apparatus comprising:
at least one processor configured to execute instructions to function as:
a first controller that automatically adjusts a focus lens to a focusing position; and
a second controller that adjusts the focus lens on the basis of a user operation quantity;
wherein the first controller and the second controller effectively work in a first drive area of the focus lens, and
wherein the first controller is disabled and the second controller effectively work in a second drive area of the focus lens.

2. The control apparatus according to claim 1, further comprising a third controller that drives the focus lens,
wherein when the second drive area changes so that a position of the focus lens is included in the second drive area to maintain an object distance while the focus lens is positioned in the first drive area, the third controller drives the focus lens so that the focus lens is positioned in the first drive area.

3. The control apparatus according to claim 2, wherein when the second drive area changes so that the position of the focus lens is included in the first drive area to maintain the object distance while the focus lens is positioned in the first drive area, the third controller drives the focus lens so that the object distance is maintained.

4. The control apparatus according to claim 2, wherein when the second drive area changes so that the position of the focus lens is included in the first drive area to maintain the object distance while the focus lens is positioned in the second drive area, the third controller drives the focus lens so that the object distance is maintained.

5. The control apparatus according to claim 1, wherein the second drive area changes according to a position of a zoom lens.

6. The control apparatus according to claim 5,
wherein the second drive area has a first size when the position of the zoom lens is at a wide angle end, and
wherein the second drive area has a second size smaller than the first size when the position of the zoom lens is at a telephoto end.

7. The control apparatus according to claim 1, wherein the second drive area changes according to an aperture value.

8. The control apparatus according to claim 7,
wherein the second drive area has a third size when the aperture value is a first aperture value, and
wherein the second drive area has a fourth size smaller than the third size when the aperture value is a second aperture value smaller than the first aperture value.

9. The control apparatus according to claim 1, further comprising a third controller that drives the focus lens,
wherein the third controller drives the focus lens on the basis of an increase/decrease change in a ratio of the second drive area in an entire drive area.

10. The control apparatus according to claim 1, further comprising:
a switcher that switches between a first power mode and a second power mode with less power consumption than the first power mode;
a memory that stores information regarding a first position of the focus lens upon switching from the first power mode to the second power mode, and
a third controller that drives the focus lens,
wherein when the first position of the focus lens is in the first drive area upon switching from the first power mode to the second power mode, the third controller moves the focus lens to a second position in the first drive area on the basis of the information regarding the first position stored in the memory upon switching from the second power mode to the first power mode.

11. The control apparatus according to claim 10, wherein when the first position of the focus lens is in the second drive area upon switching from the first power mode to the second power mode, the third controller does not move the focus lens upon switching from the second power mode to the first power mode.

12. The control apparatus according to claim 1, further comprising:
a switcher that switches between a first power mode and a second power mode with less power consumption than the first power mode;
a memory that stores information regarding a first position of the focus lens upon switching from the first power mode to the second power mode, and
a third controller that drives the focus lens,
wherein when the first position of the focus lens is in the second drive area upon switching from the first power mode to the second power mode, the third controller moves the focus lens to maintain an object distance upon switching from the second power mode to the first power mode.

13. The control apparatus according to claim 1, further comprising:
a setter that switchably sets first control by the first controller and second control by the second controller, and
a third controller that drives the focus lens,
wherein, in a case where the setter sets the second control, when the second drive area changes so that a position of the focus lens is included in the second drive area to maintain an object distance while the focus lens is positioned in the first drive area, or when the second drive area changes so that the position of the focus lens is included in the first drive area to maintain the object distance while the focus lens is positioned in the second drive area, the third controller moves the focus lens to maintain the object distance.

14. The control apparatus according to claim 13, wherein, in a case where the setter sets the first control, when the second drive area changes so that the position of the focus lens is included in the second drive area to maintain the object distance while the focus lens is positioned in the first drive area, the third controller moves the focus lens to maintain the object distance.

15. The control apparatus according to claim 13, wherein, in a case where the setter sets the first control, when the second drive area changes so that the position of the focus lens is included in the first drive area to maintain the object distance while the focus lens is positioned in the second drive area, the third controller moves the focus lens to maintain the object distance.

16. A lens apparatus comprising:
a focus lens; and
the control apparatus according to claim 1.

17. An imaging apparatus comprising:
an image sensor; and
the control apparatus according to claim 1.

18. A control apparatus comprising:
at least one processor configured to execute instructions to function as:
a first controller that automatically adjusts a focus lens to a focusing position;
a second controller that adjusts the focus lens on the basis of a user operation; and
a zoom tracking controller configured to move the focus lens so as to reduce an image plane fluctuation caused by a movement of a zoom lens performing zooming,
wherein a drive area of the focus lens includes a first drive area and a second drive area,
wherein in the second drive area, the first controller cannot adjust focus and the second controller can adjust the focus,
wherein depending on a zoom lens position, the second drive range changes, and
wherein during the zooming, the zoom tracking controller drives the focus lens based on the zoom lens position after the zooming and the second drive area after the zooming.

19. The control apparatus according to claim 18, wherein depending on the zoom lens position, the first drive area of the focus lens in which any of the first controller and the second controller can control the focus and the second drive area of the focus lens change,
wherein in a case where a first position of the focus lens at which an in-focus state is acquired with the zoom lens position before the zooming is located in the second drive area and a second position of the focus lens at which the in-focus state is maintained with the zoom lens position after the zooming is located in the first drive area, the zoom tracking controller moves the focus lens to the second position in the zooming, and
wherein in a case where a third position of the focus lens at which the in-focus state is acquired with the zoom lens position before the zooming is located in the first drive area and a fourth position of the focus lens at which the in-focus state is maintained with the zoom lens position after the zooming is located in the second drive area, the zoom tracking controller moves the focus lens so as not to move the focus lens to the second drive area in the zooming.

20. The control apparatus according to claim 19, wherein in a case where the third position of the focus lens is located in the first drive area and the fourth position of the focus lens is located in the second drive area, the zoom tracking controller moves the focus lens to a position closest to a closest distance side in the first drive area corresponding to the zoom lens position after the zooming.

21. The control apparatus according to claim 18, wherein in a case where the zoom lens position is a wide-angle end, the second drive area has a first length, and wherein in a case where the zoom lens position is a telephoto end, the second drive area has a second length shorter than the first length.

22. A lens apparatus comprising:
a focus lens; and
the control apparatus according to claim 18.

23. An imaging apparatus comprising:
an image sensor; and
the control apparatus according to claim 18.

\* \* \* \* \*